(12) United States Patent
Gehring

(10) Patent No.: US 11,894,584 B2
(45) Date of Patent: Feb. 6, 2024

(54) BIPOLAR PLATE WITH A POSITIONING OPENING, AND METHOD FOR THE PRODUCTION THEREOF

(71) Applicant: Reinz-Dichtungs-GmbH, Neu-Ulm (DE)

(72) Inventor: Horst Gehring, Orsenhausen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 139 days.

(21) Appl. No.: 17/656,583

(22) Filed: Mar. 25, 2022

(65) Prior Publication Data

US 2022/0311022 A1 Sep. 29, 2022

(30) Foreign Application Priority Data

Mar. 26, 2021 (DE) ...................... 10 2021 203 068.8

(51) Int. Cl.
*H01M 8/0297* (2016.01)
*H01M 8/2404* (2016.01)

(52) U.S. Cl.
CPC ....... *H01M 8/0297* (2013.01); *H01M 8/2404* (2016.02)

(58) Field of Classification Search
CPC .......... C25B 9/63; H01M 8/1004; H01M 8/02
See application file for complete search history.

(56) References Cited

U.S. PATENT DOCUMENTS

2018/0366761 A1* 12/2018 Ohmori ................. H01M 8/248
2021/0218047 A1* 7/2021 Ohmori ............... H01M 8/2475

FOREIGN PATENT DOCUMENTS

DE 102009036039 A1 2/2011
DE 102021203351 A1 10/2021

OTHER PUBLICATIONS

DE102009036039B4—machine translation (Year: 2011).*

* cited by examiner

*Primary Examiner* — Haroon S. Sheikh
(74) *Attorney, Agent, or Firm* — McCoy Russell LLP

(57) ABSTRACT

Systems and methods for one or more bipolar plate and a stack for an electrochemical system. The bipolar plate comprising a first individual plate and a second individual plate. The first individual plate has at least one first positioning opening with a first crimping. The second individual plate has at least one second positioning opening with a second crimping. The first positioning opening and the second positioning opening of the individual plates arranged in alignment with each other. The first crimping forms at least one first contact area for a first positioning pin and the second crimping forms at least one second contact area for the first positioning pin.

17 Claims, 10 Drawing Sheets

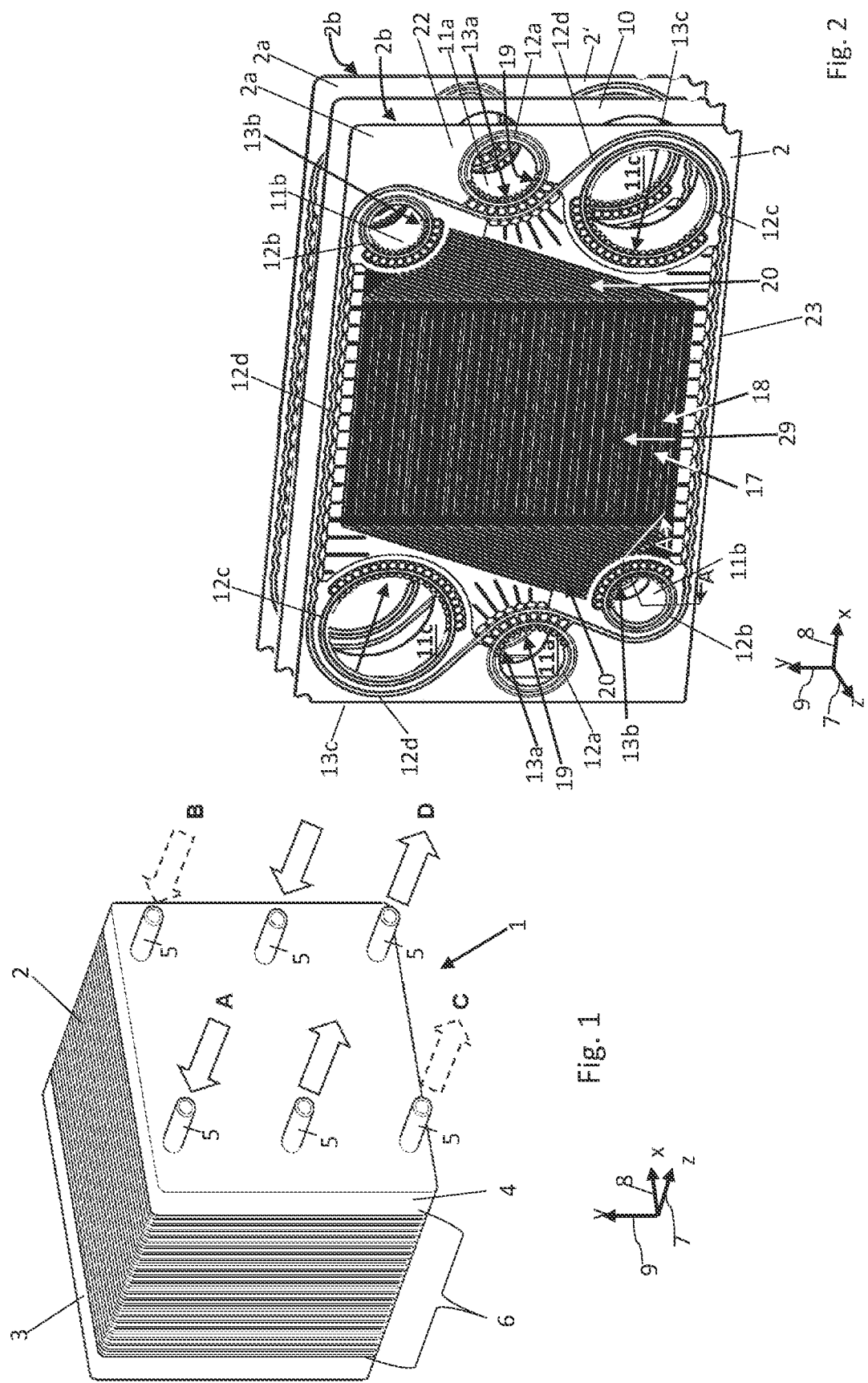

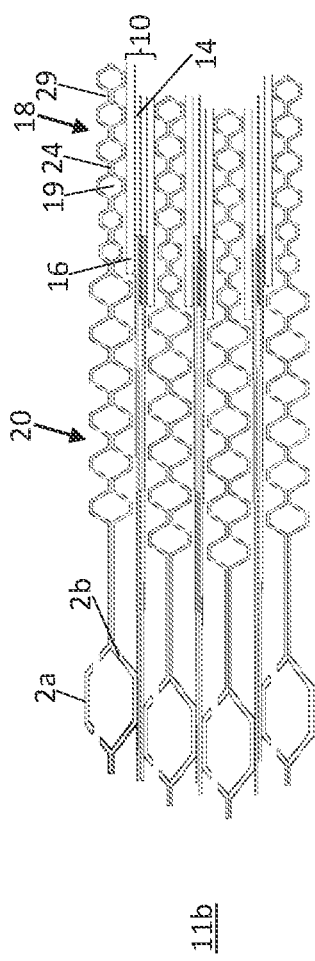
Fig. 3A
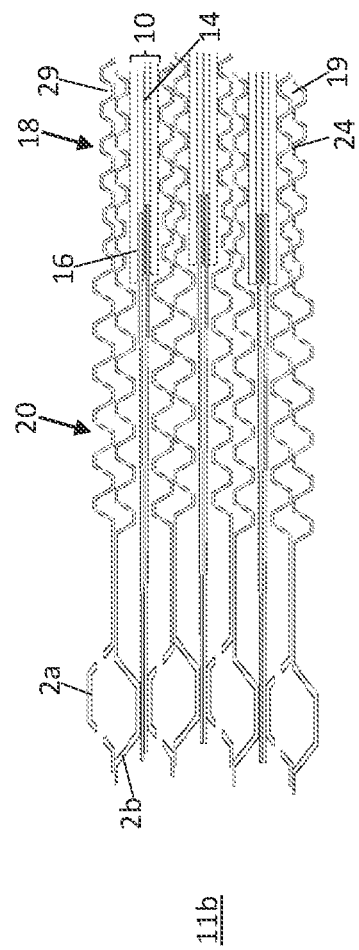
Fig. 3B
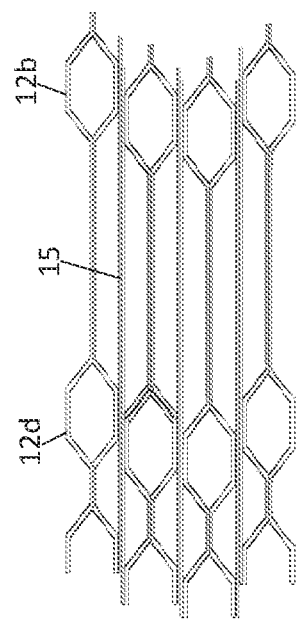
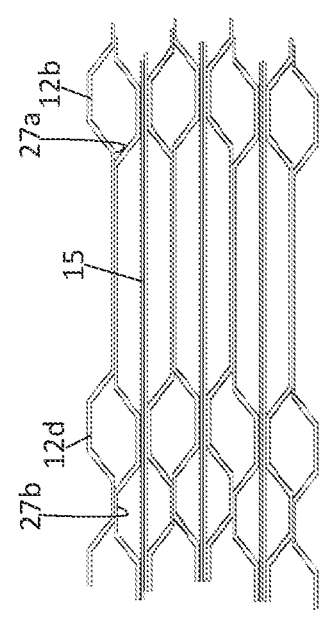

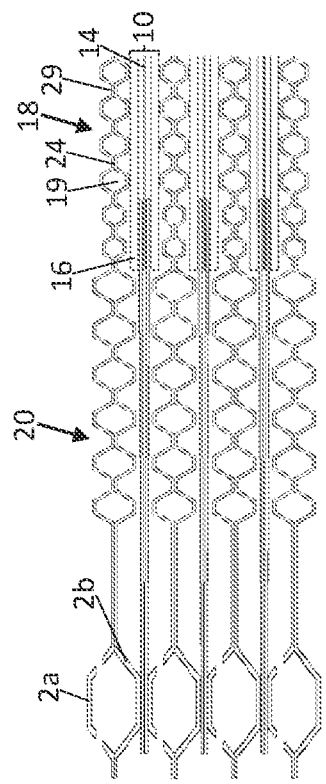
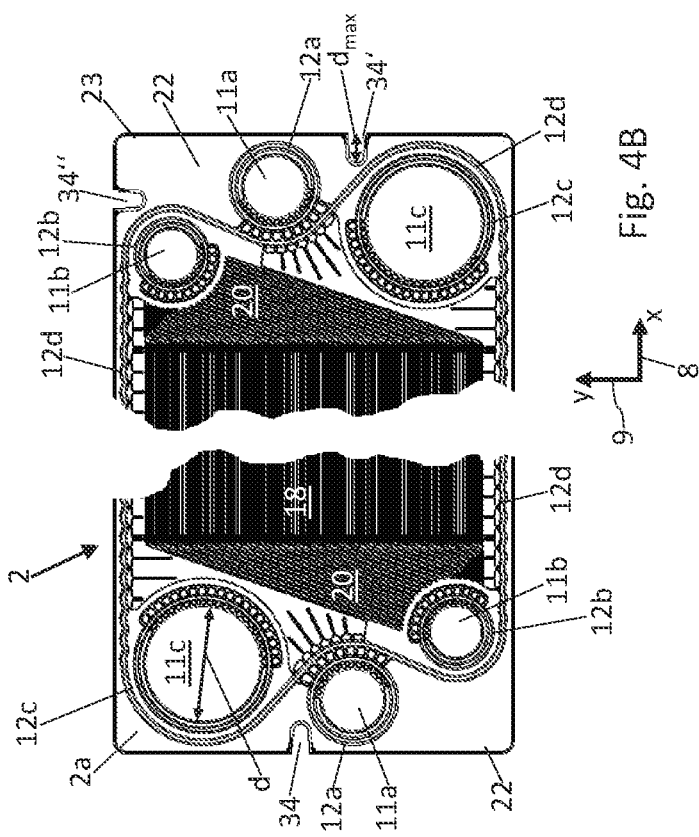
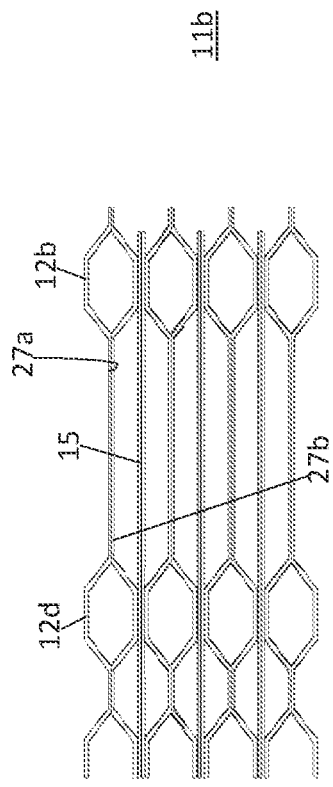
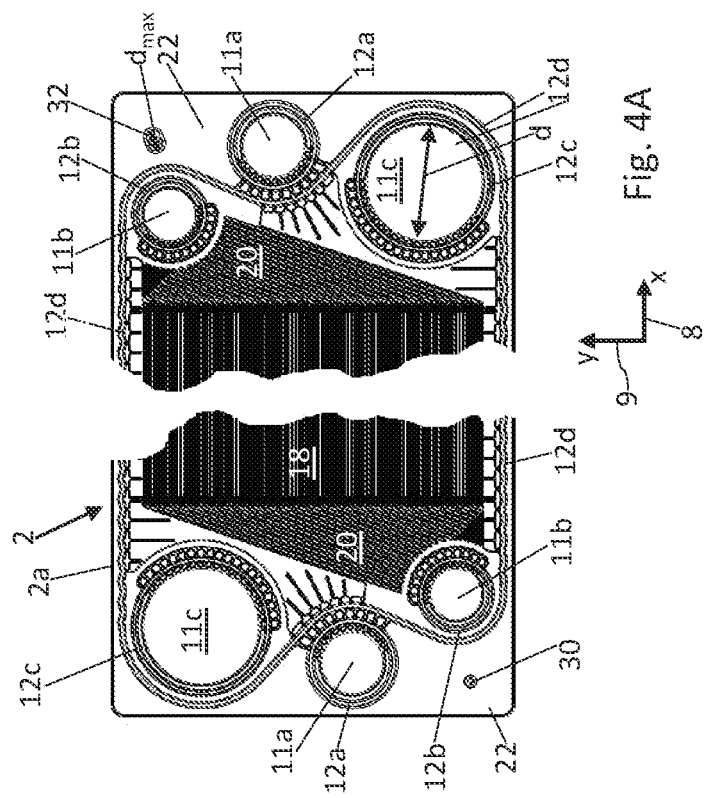

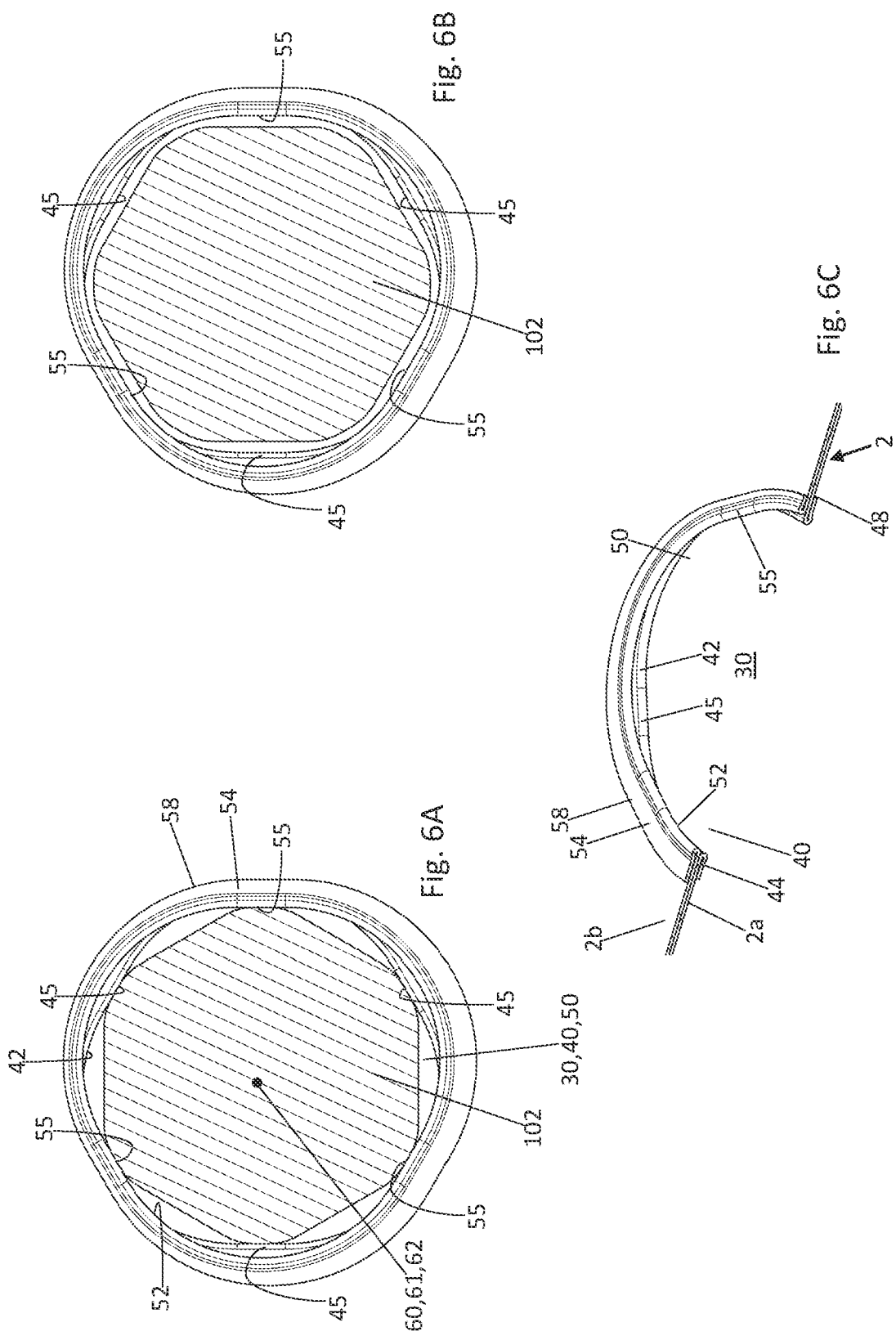

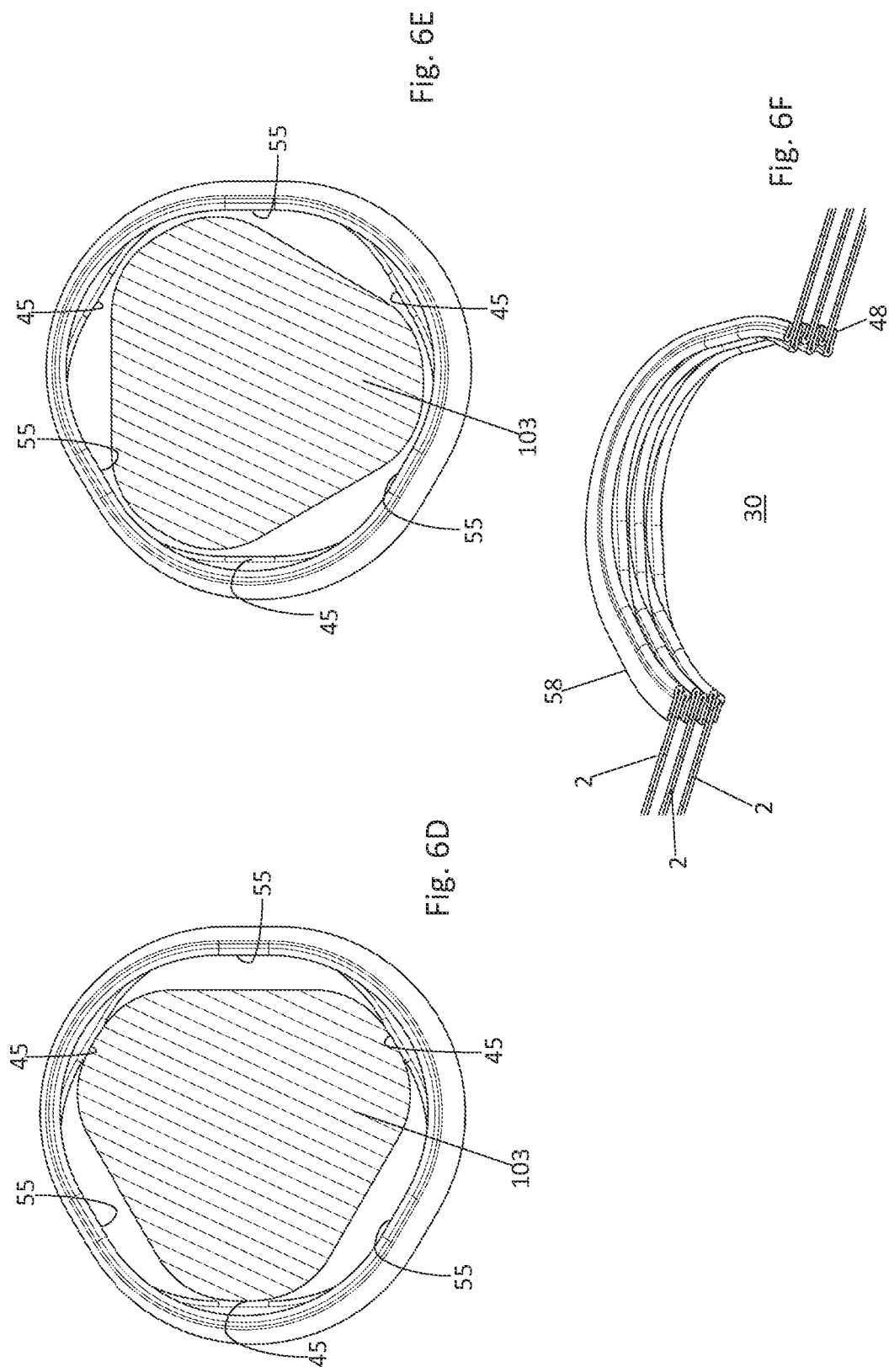

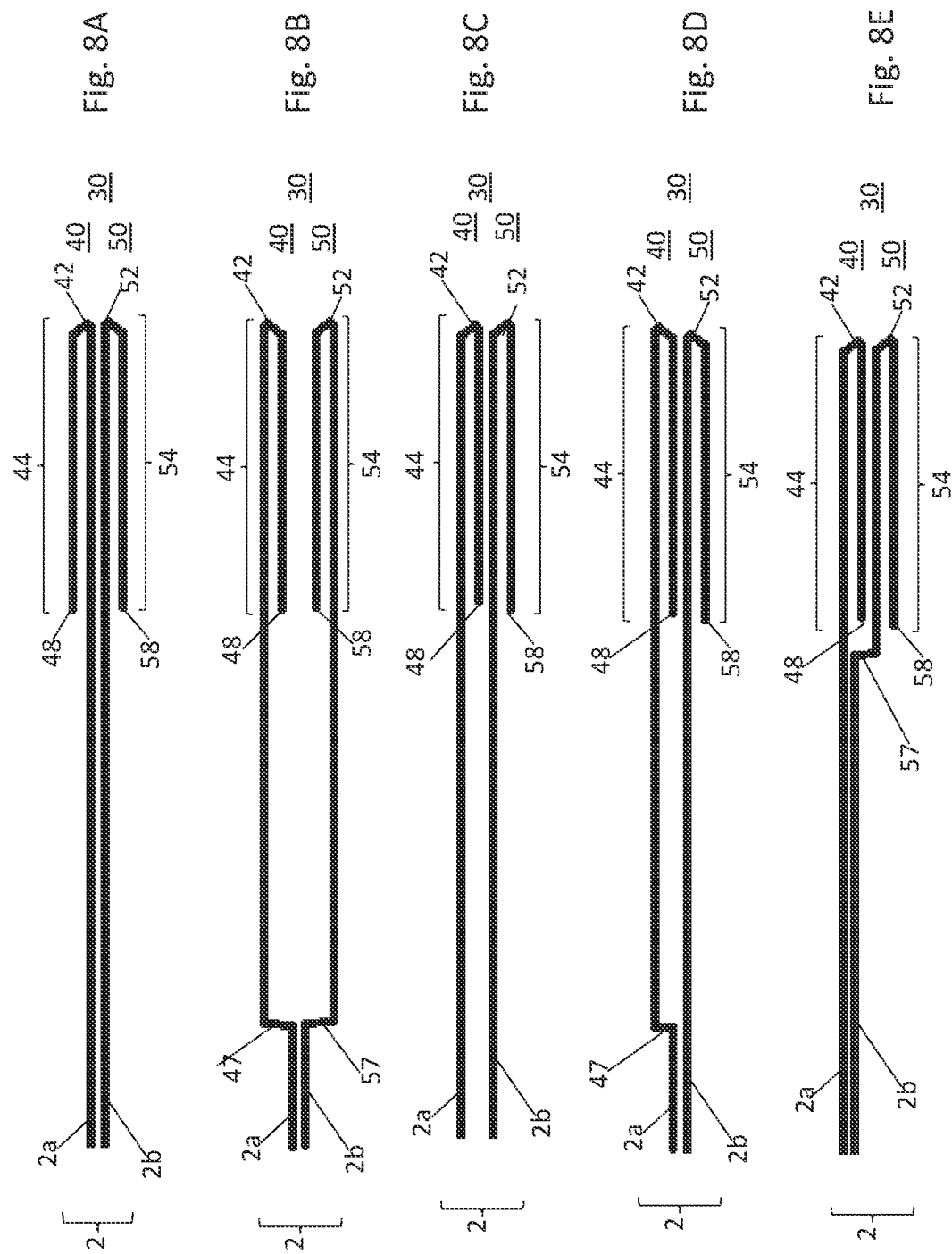

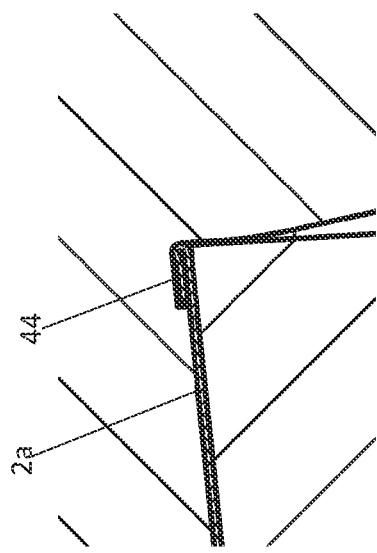
Fig. 9C
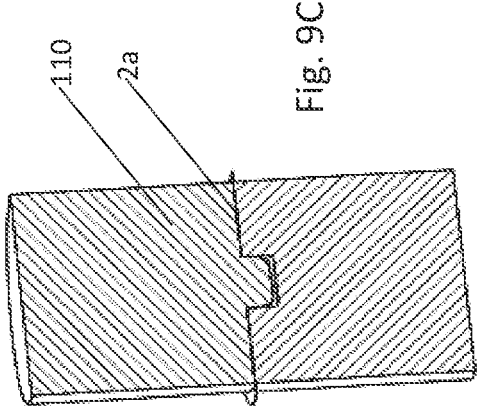
Fig. 9A
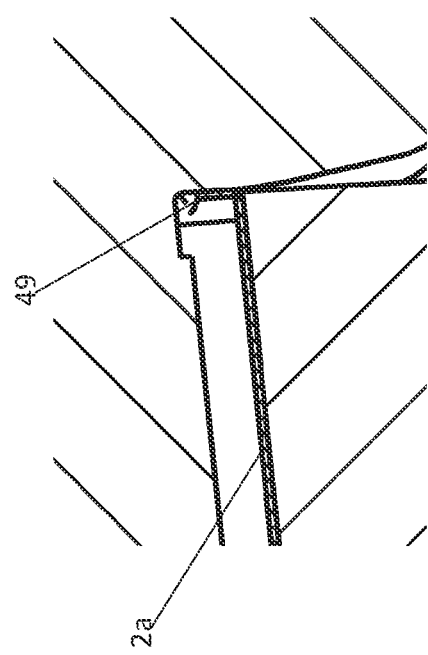
Fig. 9D (Detail)
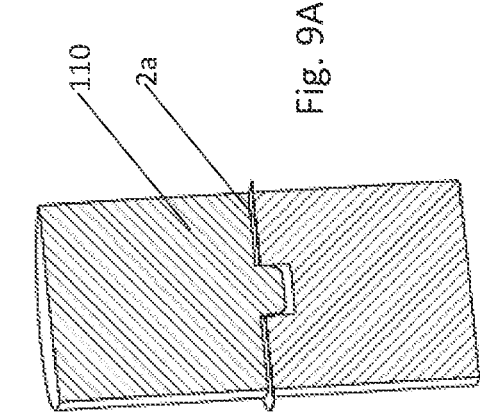
Fig. 9B (Detail)

BIPOLAR PLATE WITH A POSITIONING OPENING, AND METHOD FOR THE PRODUCTION THEREOF

CROSS-REFERENCE TO RELATED APPLICATION

The present application claims priority to German Patent Application No. 10 2021 203 068.8, entitled "BIPOLAR PLATE WITH A POSITIONING OPENING, AND METHOD FOR THE PRODUCTION THEREOF", and filed on Mar. 26, 2021. The entire contents of the above-listed application is hereby incorporated by reference for all purposes.

TECHNICAL FIELD

The present disclosure relates to a bipolar plate for an electrochemical system and to a method for the production thereof, the bipolar plate having at least one positioning opening. The electrochemical system may be a fuel cell system, an electrochemical compressor, an electrolyser, or a redox flow battery.

BACKGROUND AND SUMMARY

Known electrochemical systems usually comprise a stack of electrochemical cells, which are each separated by metal separator plates. These separator plates are often designed as bipolar plates.

These bipolar plates usually comprise two individual metal plates which are joined together, typically by welding, these metal plates usually being manufactured from thin metal sheets. Each separator plate or bipolar plate then contains a first metal sheet and a second metal sheet. The bipolar plates or the individual plates forming the bipolar plates may serve for example for electrically contacting the electrodes of the individual electrochemical cells (for example fuel cells, indirectly) and/or for electrically connecting adjacent cells (series connection of the cells).

The bipolar plates or the individual plates or metal sheets forming the bipolar plates may have a channel structure, which is designed to supply one or more media to the cells and/or to remove reaction products therefrom. The media may for example be fuels (for example hydrogen or methanol), reaction gases (for example air or oxygen) or coolants. Such a channel structure is usually arranged in an electrochemically active region (gas distribution structure/flow field). Furthermore, the bipolar plates or the individual plates or metal sheets forming the bipolar plates may be designed to transmit the waste heat that arises when converting electrical and/or chemical energy in the electrochemical cell, and also to seal off the various media channels and cooling channels with respect to each other and/or with respect to the outside. The aforementioned channel structures and/or sealing structures, such as sealing beads, are for example embossed in the individual plates by means of an embossing tool. Similar structures are also present on separator plates of humidifiers for electrochemical systems. Therefore, what is stated below can also correspondingly apply to separator plates for humidifiers.

The bipolar plates usually have several tasks:
electrical contacting, such as indirect electrical contacting, of the electrodes of the individual electrochemical cells and transmission of the current to the adjacent cell (series connection of the cells),
supplying the cells with reactants, such as water or gases for example, and removing the generated reaction gas via a corresponding distribution structure,
transmitting the waste heat that arises during generation in the electrochemical cell, and
sealing off the various media channels and cooling channels of the so-called flow field with respect to each other and with respect to the outside.

When producing the bipolar plates, it is very important to adhere to tight dimensional tolerances since, otherwise, functional or even safety-relevant malfunctions may occur. This is especially essential in the case of welded multilayer bipolar plates.

However, a variety of inaccuracies can occur during the steps necessary for producing a bipolar plate from two metal sheets. Typically, usually at least two different tools are used when machining each of the individual plates of a bipolar plate, for example an embossing tool for deforming regions of the individual plate and a punching tool for creating through-openings in the individual plate. If the individual plate is not optimally positioned in at least one of the tools, this can consequently lead to the situation where a relative alignment of the embossed structures of this individual plate in relation to the punched structures of the same individual plate deviates from an ideal relative alignment. As an alternative or in addition, when joining a first individual plate or a first metal sheet to a second individual plate or to a second metal sheet, assembly errors may occur if a relative alignment of the two individual plates or metal sheets to be joined in the joining tool deviates from an ideal relative alignment in the joining tool.

Previously, positioning holes have been used to ensure accurate positioning of the separator plates relative to each other. If these positioning holes, which ensure the accurate positioning of the at least two separator plates relative to each other, are formed at the same time as the other through-openings and at the same time as the cutting of the outer edges of the separator plates, it has been found in practice that the accuracy and reproducibility of the positioning of the separator plates relative to each other is insufficient. This may lead to an offset of the channel geometries of the bipolar plates. If there is an extreme offset between the channels, then when joining the separator plates of the bipolar plate, such as in the electrochemically active region or in other channel-guiding regions, optionally including at the outer edge or in the vicinity of through-openings, welding takes place at points where the separator plates do not bear against each other, and therefore thermal damage may occur as early as during the welding of the electrochemical system. Furthermore, when building the stack, an inaccuracy may occur in the positioning of one bipolar plate, formed of two individual plates, relative to the next or in an ongoing manner to further bipolar plates, so that an offset between the sealing elements of adjacent or further-apart bipolar plates leads to an insufficient transmission of force in the entire stack and thus to leaks in the overall system. In addition, an offset of media through-openings can lead to an impaired or even insufficient supply or removal of media.

In order to reduce the manufacturing tolerances in the positioning of the plates relative to each other, the procedure can take place for example by way of a rough positioning and a fine positioning. Since the position of the cut contours is relatively inaccurate (see explanations above), these cut contours are typically used for the rough positioning. For the subsequent fine positioning, additional embossed elements are provided in the plates, but these also take up additional space. The roughly positioned plates, which are unintentionally bent by the forming process, are partially already pressed together when closing the welding tool, before the positioning elements of the plates correctly engage in one another. This makes it more difficult to finely centre the plates relative to each other.

In summary, the splitting of the procedure into rough positioning and fine positioning takes up additional space on the components. The interplay between the two centring systems is made even more difficult by the spatial separation of the two systems, for example in the case of individual plates that are not flat.

Another approach is to use the outer contour of the bipolar plates to position these relative to each other. Again, however, the plates cannot always be arranged relative to each other with the required precision; which may not allow positioning in relation to the integrally moulded structures, such as channel structures for example.

One of the objects of the present disclosure is therefore to solve the above-mentioned problems at least in part.

This object is achieved by embodiments described herein.

Accordingly, according to a first aspect, a bipolar plate for an electrochemical system is provided. The bipolar plate comprises a first individual plate and a second individual plate, which are connected to each other.

The first individual plate has at least one first positioning opening with a first crimping, the first positioning opening being at least partially surrounded by the first crimping. The second individual plate has at least one second positioning opening with a second crimping, the second positioning opening being at least partially surrounded by the second crimping.

The first positioning opening and the second positioning opening of the individual plates are arranged in alignment with each other and form a positioning opening of the bipolar plate. The first crimping forms at least one first contact area for a first positioning pin and the second crimping forms at least one second contact area for the first positioning pin.

The respective crimping and the associated positioning opening of the individual plate are typically created by forming an edge of a positioning hole (see also the production method below). As a result, the final creation of the positioning opening, including the rim thereof, can take place in the same forming tool as the other embossed structures provided in the individual plate, for example at the same time as the creation of the other embossed structures, and can take place in just one operation (see also the production method described below). The accuracy with which the positioning opening and the other embossed structures are produced thus depends largely on a single tool, as a result of which manufacturing tolerances can be adhered to much better or remain constant.

By way of example, each individual plate contains a flow field for guiding a medium along a flat side of the respective individual plate. Here, the flow field may be embossed into the individual plate and may comprise for example a plurality of embossed structures. The flow field may be produced at the same time as the crimpings. The respective positioning opening and the respective flow field of the individual plate in question may have, for example, a predetermined position and/or alignment relative to each other, which are defined for example at the centre point of the positioning opening and/or at the centre point of the flow field, wherein a deviation from the predetermined position may be less than 200 µm, less than 100 µm, or less than 50 µm.

Here, positioning openings can be regarded as in alignment with each other if a straight line drawn through the centroids thereof extends perpendicular to the plate planes of the individual plates. According to a further definition, the respective positioning openings can be regarded as in alignment with each other if a positioning pin can be inserted through the respective positioning openings simultaneously. The fact that the respective crimping forms a contact area for the positioning pin is not intended to mean that the respective entire crimping forms a contact area, but rather usually a part of the respective crimping that points towards the positioning opening or only a portion of this part.

Hereinafter, the first positioning opening, the second positioning opening and/or the positioning opening of the bipolar plate will sometimes be referred to for simplicity and collectively as "the respective positioning opening". "The respective positioning opening" can therefore be understood to mean the first positioning opening, the second positioning opening and/or the positioning opening of the bipolar plate, depending on the context.

The respective positioning opening may only have the function of positioning the individual plates or the bipolar plate, for example relative to a tool, relative to a further, directly adjacent, individual plate or bipolar plate or relative to a further, indirectly adjacent, individual plate or bipolar plate. The tool in which the first individual plate, the second individual plate and/or the bipolar plate can be positioned in a defined manner by means of the respective positioning opening may be, for example, a positioning device, a fixing device, a joining tool such as a welding tool, a surface treatment device such as a coating device and/or a surface structuring device, or a cutting device, such as a punching or laser cutting device. In general, the respective positioning opening permits the engagement of a first positioning pin of said positioning device. Said tool therefore comprises at least one first positioning pin, which can be received for example by means of a form fit in the respective positioning opening and can come into contact there in the region of the contact areas of the crimpings.

Depending on the embodiment, the first positioning opening and the second positioning opening may each be designed as a notch in an outer edge of the respective individual plate or as a through-opening in the respective individual plate, which is completely surrounded by material of the respective individual plate. Usually, however, no media-guiding function is associated with this type of through-opening. For example, the respective positioning opening differs from any fluid-conducting through-openings that may likewise be formed in the individual plates or the bipolar plate and may for example form channels for the inflow or outflow of fluids such as reaction media or coolant.

A first rim of the first positioning opening and a second rim of the second positioning opening generally form a first edge of the first positioning opening and a second edge of the second positioning opening, and thus at least in the region of the respective crimping do not form a free end of the material. A rim of the respective crimping that points towards the respective positioning opening may be part of the rim of the respective positioning opening. The rim of the respective crimping that points towards the positioning opening may form the respective contact area. Said rims of the crimpings are not free ends of the crimping. Hereinbelow, the term "rim" refers to the rim of the respective positioning opening, unless stated otherwise. The portion of the respective crimping that points towards the free end typically extends in a radial direction away from the respective positioning opening. A free end of the material surrounding the respective positioning opening may be crimped (folded over) through at least 100°, at least 120°, or at least 140°, for example at least 160° in relation to a plate plane defined by the respective individual plate. Said respective free end may thus be oriented at an angle to the plate plane or substantially parallel (at an angle of approximately 180°) to the plate plane. In some embodiments, the free end is crimped in such a way that the free end makes contact with the material of the respective individual plate in the non-crimped region.

Usually, the first crimping is provided in at least one first rim segment of the first rim. Furthermore, the second crimping may be provided in at least one second rim segment of the second rim. Usually, in at least one first rim segment of the first rim the first rim is part of the first crimping. Furthermore, in at least one second rim segment of the second rim the second rim is part of the second crimping. Between these rim segments, the respective rim can be formed without crimping. The respective rim may therefore have, in an alternating manner, rim segments with crimping and rim segments without crimping. In other words, the respective rim may have, in an alternating manner, such rim segments in which the rim is part of a crimping and other rim segments in which the rim is not part of a crimping. Unless stated otherwise, the rim segments mentioned below have a crimping. The first rim and/or the second rim may have a plurality of rim segments, which follow each other in the circumferential direction of the respective positioning opening and may be spaced apart from each other. By way of example, two, three, four or more rim segments are provided per positioning opening. The rim segments may have an equal spacing from each other in the circumferential direction of the respective positioning opening. The portions of the crimping that point towards the free end thereof extend in the rim segments in the radial direction of the respective positioning opening, it being possible for example for these to be tab-shaped. Depending on the embodiment, the first rim segments and the second rim segments (and the corresponding crimpings) may be arranged at identical or different positions in relation to a circumferential direction of the positioning opening of the bipolar plate.

In an alternative embodiment, the first crimping of the first rim and/or the second crimping of the second rim completely surround the respective positioning opening. In this case, the respective crimping as well as the respective rim is therefore intrinsically closed.

The height of the plate in the region of the first crimping and/or the second crimping is usually smaller than a maximum component height of the first individual plate or second individual plate, measured perpendicular to the plate plane of the respective individual plate. In practice, the height of the respective individual plate in the region of the crimping is slightly more than twice the plate thickness, for example at most 4 times, at most 3 times, or at most 2.5 times a single plate thickness. For instance, the crimpings may have a smaller height than the embossed structures provided in the individual plates, such as channel structures, sealing elements or bead arrangements. The crimpings therefore may have no influence on the maximum component height of the respective individual plates or the bipolar plate.

The first contact area of the first crimping may sometimes form a contact area for a second positioning pin. In some embodiments, the first crimping forms at least one third contact area for the second positioning pin.

It may be provided that the first contact area, the second contact area and/or the third contact area are located at different or identical positions in the circumferential direction of the positioning opening of the bipolar plate.

While the first positioning pin is designed to align the first individual plate and the second individual plate relative to each other, the second positioning pin may be provided to align the bipolar plate relative to an adjacent bipolar plate and/or relative to a plurality of bipolar plates. Overall, therefore, the same positioning opening of the bipolar plate can be used both for positioning the individual plates relative to each other and for positioning the bipolar plate relative to further bipolar plates, as a result of which space can be saved on the respective plates.

Optionally, an orthogonal projection of the second positioning opening onto the first individual plate perpendicular to the plate plane of the bipolar plate defines a first projection area, the first individual plate having at least part of the first crimping in the region of the first projection area. Optionally, an orthogonal projection of the first positioning opening onto the second individual plate perpendicular to the plate plane of the bipolar plate defines a second projection area, the second individual plate having at least part of the second crimping in the region of the second projection area.

It may be provided that the first crimping comprises the first and/or the third contact area in the region of the first projection area. Optionally, the second crimping may comprise the second contact area in the region of the second projection area.

According to one embodiment, the first positioning opening has a symmetry in relation to a first plane of symmetry or in relation to a first axis of symmetry. The first plane of symmetry or the first axis of symmetry may be oriented perpendicular to a first plate plane defined by the first individual plate. Optionally, the second positioning opening has a symmetry in relation to a second plane of symmetry or in relation to a second axis of symmetry. For instance, the second plane of symmetry or the second axis of symmetry is oriented perpendicular to a second plate plane defined by the second individual plate.

The first positioning opening and the second positioning opening may be identical to or different from each other in terms of surface area and/or contour and/or orientation. If they have the same area and/or the same contour, the first positioning opening and the second positioning opening can be rotated relative to each other. If they have the same orientation, the contour and/or the surface area of the first positioning opening and of the second positioning opening may be different.

The respective positioning opening may for example be oval, slot-shaped or rounded polygonal. When designed as a notch in the outer edge, the respective positioning opening may for example be semi-circular or semi-oval, may correspond to a different segment of a circular shape or of an oval, or may be a portion of a rounded polygonal shape. Optionally, the respective positioning opening may be designed with rotational symmetry of order n, where n may be greater than 1 and/or less than 60.

The first crimping and the second crimping of a bipolar plate may point in different axial directions of the first and second positioning opening. They may both be arranged on the inner side of the bipolar plate and point towards each other, so that they come to bear against each other. However, they may be arranged on opposite flat sides of the bipolar plate and point away from each other. Alternatively, the first and the second crimping of a bipolar plate may point in the same axial direction in relation to the first or second positioning opening.

The first individual plate and/or the second individual plate may each have a plate body, which may be designed as a metal plate and may be manufactured from stainless steel.

The respective crimpings are generally formed by folding over the material of the plate body. The crimpings are thus usually made of the same material as the associated plate body, such as in one piece therewith.

In a further aspect of the present specification, an electrochemical system is provided. The electrochemical system comprises a plurality of stacked bipolar plates of the type mentioned above. Typically, two adjacent bipolar plates bound an electrochemical cell, wherein the electrochemical cell may have at least one gas diffusion layer and one membrane electrode assembly. As a result of the way in which they are produced, the positioning openings of the stacked bipolar plates are usually in alignment with each other and form a positioning channel. In this case, the electrochemical cells may also have aligned cutouts, for example in the region of the edge reinforcement of the membrane electrode assembly.

According to a further aspect of the present specification, a method for producing a bipolar plate, such as of the type mentioned above, is proposed. The method comprises the steps:

providing a first individual plate and a second individual plate;

creating, for instance punching, at least one first positioning hole in the first individual plate and at least one second positioning hole in the second individual plate;

forming the first individual plate in such a way that a first edge of the first positioning hole is at least partially crimped to form a first positioning opening, so that the first positioning opening has a first crimping;

forming the second individual plate in such a way that a second edge of the second positioning hole is at least partially crimped to form a second positioning opening, so that the second positioning opening has a second crimping;

positioning the individual plates on a first positioning pin by means of the positioning openings of the individual plates, wherein the two crimpings of the individual plates come into contact with the first positioning pin, and joining the two individual plates.

The forming of the first individual plate and of the second individual plate typically takes place in the same forming tool. By crimping the edge contour in the forming tool, the edge contour is not defined until the forming tool, independently of the cut contour. By crimping the edges thereof, the positioning holes are widened, and therefore the original positioning holes have a smaller diameter and/or a smaller area than the associated positioning openings.

In the respective forming step, at least one flow field for guiding a medium along a flat side of the respective individual plate can be simultaneously created in the respective individual plate. The respective forming step may comprise a single forming step, in which both the flow field and the positioning opening are completely formed. However, the respective forming step may also include a pre-forming step and a finish-forming step. In this case, at least the final part of the forming of both the flow field and the positioning opening takes place in the finish-forming step. The forming of the respective individual plate and, if provided, the pre-forming step and the finish-forming step may for example comprise deep drawing and/or embossing and/or hydroforming and/or bending of the individual plate.

The final creation of the positioning opening may take place in the same tool as the creation of the flow field, so that the manufacturing tolerances between the positioning opening and the flow field remain constant in a component once completed and depend only on the forming tool. The contours of the positioning opening thus produced are then much more accurate in relation to other embossed contours of the individual plate. By crimping the entire rim, the respective individual plate can at these points become thicker than a thickness of the individual plate only by a factor of around two.

In the step of positioning the individual plates relative to each other, the crimpings of the individual plates come into contact with the first positioning pin at least in some portions, such as only in a first portion. The first portion may be formed by the above-mentioned first contact area and/or the above-mentioned second contact area.

The way in which the individual plates are counted here does not relate to a specific order of production thereof.

In the joining step, the individual plates may be joined to each other in a materially bonded manner, for example by means of welding, such as laser welding.

The method may also comprise the following step:

removing the bipolar plate by laterally displacing the first positioning pin perpendicular to an axial direction defined by the positioning pin and/or by rotating the first positioning pin.

By way of example, if the first positioning pin has rotational symmetry of order n in relation to an axis of rotational symmetry, the first positioning pin can be rotated through an angle $\phi/2$, where $\phi=360°/n$, and n may be a natural number greater than 1 and/or less than 60. For example, n=2, 3, 4, 5, 6, 8, 10, 12, 24 or 36.

For instance, therefore, the bipolar plate described above can be produced by the method. Some or all features of the bipolar plate described above can therefore be combined with the production method, and vice versa.

In addition, the present specification provides a method for producing a stack for an electrochemical system. Here, the stack comprises a plurality of stacked bipolar plates of the type described above. The method comprises the step:

positioning the bipolar plates on a second positioning pin by means of the positioning openings of the bipolar plates; and pressing the bipolar plates together to form the aforementioned stack.

In the positioning step, therefore, the bipolar plates are placed one on top of the other and stacked. To stack multiple bipolar plates, these are positioned relative to each other at the created rims of the positioning openings. Since the height of the crimpings is usually smaller than the component height (see above), said crimpings usually have no influence on the spacing between the components.

In the positioning step, the crimpings of the individual plates come into contact with the second positioning pin at least in some portions, such as in the region of a third contact area, wherein the third contact area may also coincide in full or in part with the first contact area. For instance, only the first crimpings of the first individual plates come into contact with the second positioning pin, while the second crimpings of the second individual plates are spaced apart from the second positioning pin, for example in a radial direction. The contact between the second positioning pin and the first crimping of the first individual plate may take place in the same region, i.e. in the first contact area, or in a different region than the contact between the first positioning pin and the crimping of the first individual plate. It is also possible that contact with the second positioning pin takes place only in a portion of the first contact area. The way in which the individual plates are counted is arbitrary here and is merely intended to illustrate that just one of the individual plates comes into contact with the second positioning pin.

Therefore, while the above-mentioned first and second contact areas of the crimpings are provided for positioning the individual plates relative to each other, said third contact areas of the crimpings are provided for positioning the bipolar plates relative to each other. The first positioning pin for positioning the individual plates relative to each other and the second positioning pin for positioning the bipolar plates relative to each other are typically two different pins of different tools.

The term "positioning" of the respective plate(s), which is used in this specification, may also include the term "centring" and/or the term "aligning" of the respective plate(s), wherein the terms "positioning", "centring" and "aligning" of the respective plate(s) can be used synonymously.

The method may comprise the following additional step: removing the stack by laterally displacing the second positioning pin perpendicular to an axial direction defined by the second positioning pin in the state of contact and/or by rotating the second positioning pin.

When positioning the bipolar plates by means of the second positioning pin, the second positioning pin usually only comes into engagement with the rims of the first crimpings. By displacing or rotating the second positioning pin, the first crimpings and the second positioning pin can come out of engagement and the stack can be detached from the positioning pin. As a result, the stack can then be removed from the second positioning pin.

By way of example, if the second positioning pin has rotational symmetry of order n in relation to an axis of rotational symmetry, the second positioning pin can be rotated through an angle $\phi/2$, where $\phi=360°/n$, and n may be a natural number greater than 1 and/or less than 60. For example, n=2, 3, 4, 5, 6, 8, 10, 12, 24 or 36.

Bipolar plates, gas diffusion layers and membrane electrode assemblies are usually stacked in an alternating manner so that at least one gas diffusion layer and one membrane electrode assembly are arranged between adjacent bipolar plates. Furthermore, at least one end plate can be stacked at each end of the stack. The bipolar plates, the gas diffusion layers and the membrane electrode assemblies are then pressed together by compressing the end plates.

For instance, the electrochemical system described above can be produced by the method. Some or all features of the electrochemical system described above can therefore be combined with the production method, and vice versa.

Overall, the following advantages can be achieved by the various aspects of the present disclosure.

On the one hand, the same positioning opening of the bipolar plate can be used both for positioning the individual plates relative to each other and for positioning the bipolar plate relative to further bipolar plates, as a result of which space can be saved. In addition, the same reference system can be used for the individual plates, the bipolar plate(s) and the manufacturing tools, which can increase the accuracy.

Furthermore, the positioning openings are finally created only at the time of crimping. The position and orientation of the positioning openings relative to the flow field thus depends only on one tool, namely the forming tool, while the position and orientation of positioning openings relative to the flow field in the prior art depend both on the punching tool and on the forming tool. There is therefore no need for fine centring via an embossed structure according to the prior art.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Exemplary embodiments of the separator plate, of the bipolar plate, of the electrochemical system and of the production method are shown in the figures and will be explained in greater detail on the basis of the following description. In the figures:

BRIEF DESCRIPTION OF THE FIGURES

FIG. 1 schematically shows, in a perspective view, an electrochemical system comprising a plurality of separator plates or bipolar plates arranged in a stack;

FIG. 2 schematically shows, in a perspective view, two bipolar plates of the system according to FIG. 1 with a membrane electrode assembly (MEA) arranged between the bipolar plates;

FIG. 3A schematically shows a section through a plate stack of a system according to the type of system shown in FIG. 1, with an offset between adjacent bipolar plates;

FIG. 3B schematically shows a section through a plate stack of a system according to the type of system shown in FIG. 1, with an offset between adjacent individual plates;

FIG. 3C schematically shows a section through a plate stack of a system according to the type of system shown in FIG. 1, wherein both adjacent bipolar plates and adjacent separator plates are positioned in a defined manner and substantially without any offset relative to each other;

FIG. 4A schematically shows a plan view of a bipolar plate with two positioning openings;

FIG. 4B schematically shows a plan view of a bipolar plate with three positioning openings;

FIG. 6A schematically shows a plan view of positioning openings of two individual plates centred relative to each other but not yet joined to each other;

FIG. 6B schematically shows a plan view of a positioning opening of a bipolar plate comprising the individual plates of FIG. 6A;

FIG. 6C schematically shows a section through the positioning opening of the bipolar plate of FIG. 6B;

FIG. 6D schematically shows a plan view of the positioning opening of the bipolar plate of FIG. 6B, which is aligned relative to further bipolar plates by means of a second positioning pin;

FIG. 6E schematically shows a plan view of the positioning opening of the bipolar plate of FIG. 6D, which is pressed together with further bipolar plates;

FIG. 6F shows a positioning opening in a stack of bipolar plates;

FIG. 8A shows a detail view of the crimpings of one bipolar plate;

FIG. 8B shows a detail view of the crimpings of another bipolar plate;

FIG. 8C shows a detail view of the crimpings of another bipolar plate;

FIG. 8D shows a detail view of the crimpings of a further bipolar plate;

FIG. 8E shows a detail view of the crimpings of a further bipolar plate;

FIG. 9A shows a forming tool with an inserted individual plate in the non-compressed state;

FIG. 9B shows a detail view of the edge of a positioning opening of an individual plate inserted in a forming tool as in FIG. 9A;

FIG. 9C shows a forming tool with an inserted individual plate in the compressed state;

FIG. 9D shows a detail view of the edge of a positioning opening of an individual plate inserted in a forming tool in the compressed state as in FIG. 9C;

Figure 5A:
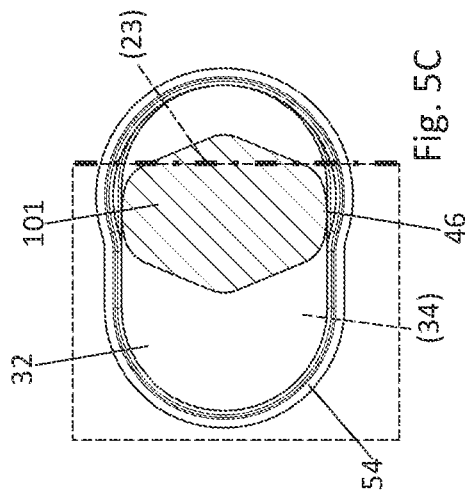
FIG. 5A schematically shows a plan view of positioning openings of two individual plates centred relative to each other by means of a first positioning pin but not yet joined to each other.

Here and in the following, features that recur in different figures are in each case denoted by the same or similar reference signs.

DETAILED DESCRIPTION

FIG. 1 shows an electrochemical system 1 with a plurality of identically constructed metallic bipolar plates 2 which are arranged in a stack 6 and are stacked along a z direction 7. The bipolar plates 2 of the stack 6 are clamped between two end plates 3, 4. The z-direction 7 will also be referred to as the stacking direction. In the present example, the system 1 is a fuel cell stack. Each two adjacent bipolar plates 2 of the stack enclose between them an electrochemical cell, which serves for example to convert chemical energy into electrical energy. To form the electrochemical cells of the system 1, a membrane electrode assembly (MEA) is arranged in each case between adjacent bipolar plates 2 of the stack (see for example FIG. 2). Each MEA typically contains at least one membrane, for example an electrolyte membrane. Furthermore, a gas diffusion layer (GDL) (not shown in FIGS. 1 and 2) may be arranged on one or both surfaces of the MEA.

In alternative embodiments, the system 1 may also be designed as an electrolyser, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyser, an electrochemical compressor or a redox flow battery may differ in each case from the media used for a fuel cell system. The same applies to the bipolar plates of a humidifier.

The z-axis 7, together with an x-axis 8 and a y-axis 9, spans a right-handed Cartesian coordinate system. The bipolar plates 2 each define a plate plane, each of the plate planes of the individual plates being oriented parallel to the x-y plane and thus perpendicular to the stacking direction or to the z-axis 7. The end plate 4 has a plurality of media ports 5, via which media can be fed to the system 1 and via which media can be discharged from the system 1. These media which can be supplied to the system 1 and carried out of the system 1 may comprise e.g. fuels such as molecular hydrogen or methanol, reaction gases such as air or oxygen, reaction products such as water vapour or depleted fuels or coolants such as water and/or glycol.

FIG. 2 shows, in a perspective view, two adjacent bipolar plates 2 of an electrochemical system of the same type as the system 1 from FIG. 1, as well as a membrane electrode assembly (MEA) 10, known from the prior art, which is arranged between these adjacent bipolar plates 2, the MEA 10 in FIG. 2 being largely obscured by the bipolar plate 2 facing towards the viewer. The bipolar plate 2 is formed of two individual plates 2a, 2b (see for example FIGS. 3A-3C), which are joined together in a materially bonded manner and of which only the first individual plate 2a facing towards the viewer is visible in FIG. 2, said first individual plate obscuring the second individual plate 2b. The individual plates 2a, 2b may each be manufactured from a metal sheet, for example from a stainless steel sheet. The individual plates 2a, 2b may for example be welded to one another, for example by laser-welded joints.

The individual plates 2a, 2b have through-openings, which are aligned with each other and form through-openings 11a-c of the bipolar plate 2. When a plurality of bipolar plates of the same type as the bipolar plate 2 are stacked, the through-openings 11a-c form lines which extend through the stack 6 in the stacking direction 7 (see FIG. 1). Typically, each of the lines formed by the through-openings 11a-c is fluidically connected to one of the media ports 5 in the end plate 4 of the system 1. For example, coolant can be introduced into the stack or discharged from the stack via the lines formed by the through-openings 11a. In contrast, the lines formed by the through-openings 11b, 11c may be configured to supply fuel and reaction gas to the electrochemical cells of the fuel cell stack 6 of the system 1 and to discharge the reaction products from the stack. The media-guiding through-openings 11a-11c are formed substantially parallel to the plate plane.

In order to seal off the through-openings 11a-c with respect to the interior of the stack 6 and with respect to the surrounding environment, the first individual plates 2a each have sealing arrangements in the form of sealing beads 12a-c, which are in each case arranged around the through-openings 11a-c and in each case completely surround the through-openings 11a-c. On the rear side of the bipolar plates 2, facing away from the viewer of FIG. 2, the second individual plates 2b have corresponding sealing beads (not shown) for sealing off the through-openings 11a-c.

In an electrochemically active region 18, the first individual plates 2a have, on the front side thereof facing towards the viewer of FIG. 2, a flow field 17 with structures for guiding a reaction medium along the front side of the individual plate 2a. In FIG. 2, these structures are defined by a plurality of webs and channels extending between the webs and delimited by the webs. On the front side of the bipolar plates 2, facing towards the viewer of FIG. 2, the first individual plates 2a additionally each have a distribution or collection region 20. The distribution or collection region 20 comprises structures which are designed to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures of the distribution or collection region 20 are likewise defined by webs and channels extending between the webs and delimited by the webs. The elements 17, 18, 20 can thus generally be understood as media-guiding embossed structures.

The sealing beads 12a-12c have passages 13a-13c, which are embodied here as local elevations in the bead, of which the passages 13a are formed both on the underside of the upper individual plate 2a and on the upper side of the lower individual plate 2b, while the passages 13b are formed in the upper individual plate 2a and the passages 13c are formed in the lower individual plate 2b. By way of example, the passages 13a enable coolant to pass between the through-opening 12a and the distribution region 20, so that the coolant enters the distribution region between the separator plates and is guided out therefrom. Furthermore, the passages 13b enable hydrogen to pass between the through-opening 12b and the distribution region on the upper side of the upper individual plate 2a; these passages 13b are characterized by perforations facing towards the distribution region and extending at an angle to the plate plane. By way of example, hydrogen thus flows through the passages 13b from the through-opening 12b to the distribution region on the upper side of the upper individual plate 2a, or in the opposite direction. The passages 13c enable air, for example, to pass between the through-opening 12c and the distribution region, so that air enters the distribution region on the underside of the lower individual plate 2b and is guided out therefrom. The associated perforations are not visible here.

The first individual plates 2a each also have a further sealing arrangement in the form of a perimeter bead 12d, which extends around the flow field 17 of the active region 18 and also around the distribution or collection region 20 and the through-openings 11b, 11c and seals these off with respect to the through-opening 11a, that is to say with respect to the coolant circuit, and with respect to the environment surrounding the system 1. The second individual plates 2b in each case include corresponding perimeter beads. The structures of the active area 18, the distribution structures of the distribution or collection area 20 and the sealing beads 12a-d are each formed in one piece with the individual plates 2a and integrally formed in the individual plates 2a, e.g., in an embossing or deep drawing process. The same applies to the corresponding distribution structures and sealing beads of the second individual plates 2b. Outside the area surrounded by the perimeter bead 12d, a predominantly unstructured outer edge area 22 results in each individual plate 2a, 2b.

The two through-openings 11b or the ducts formed by the through-openings 11b through the plate stack of the system 1 are each in fluid connection with one another via passages 13b in the sealing beads 12b, via the distribution structures of the distribution or collection area 20, and via the flow field 17 in the active area 18 of the first individual plates 2a facing the observer of FIG. 2. Similarly, the two through-openings 11c or the ducts formed by the through-openings 11c through the plate stack of the system 1 are each in fluid connection with one another via corresponding bead passages, via corresponding distribution structures, and via a corresponding flow field on an outer side of the second individual plates 2b facing away from the observer of FIG. 2. In contrast, the through-openings 11a or the lines through the plate stack of the system 1 that are formed by the through-openings 11a are in each case fluidically connected to each other via a cavity 19 that is enclosed or surrounded by the individual plates 2a, 2b. This cavity 19 serves in each case to guide a coolant through the bipolar plate 2, such as for cooling the electrochemically active region 18 of the bipolar plate 2.

FIGS. 3A, 3B, 3C schematically show a section through a portion of the plate stack 6 of the system 1 from FIG. 1, the section plane being oriented in the z-direction and thus perpendicular to the plate planes of the bipolar plates 2. It may extend, for example, along the kinked section A-A in FIG. 2.

The structurally identical bipolar plates 2 of the stack each comprise the above-described first metal individual plate 2a and the above-described second metal individual plate 2b. Structures for guiding media along the outer surfaces of the bipolar plates 2 are visible, here such as in the form of webs and channels delimited by the webs. For instance, channels 29 are shown on the surfaces of adjoining individual plates 2a, 2b that point away from each other, and cooling channels are shown in the cavity 19 between adjoining individual plates 2a, 2b. Between the cooling channels 19, the two individual plates 2a, 2b bear against each other in a contact region 24 and are connected to each other there, in the present example by means of laser welds.

A membrane electrode assembly (MEA) 10, known for example from the prior art, is arranged in each case between adjacent bipolar plates 2 of the stack. Each MEA 10 typically comprises a membrane, for example an electrolyte membrane, and an edge portion 15 connected to the membrane. By way of example, the edge portion 15 may be connected to the membrane in a materially bonded manner, for example by adhesive bonding or by lamination.

The membrane of the MEA 10 extends in each case at least over the active region 18 of the adjoining bipolar plates 2 and there enables a proton transfer via or through the membrane. However, the membrane does not extend into the distribution or collection region 20. The edge portion 15 of the MEA 10 serves in each case for positioning, attaching and sealing off the membrane between the adjoining bipolar plates 2. When the bipolar plates 2 of the system 1 are clamped in the stacking direction between the end plates 3, 4 (see FIG. 1), the edge portion 15 of the MEA 10 can for example be compressed in each case between the sealing beads 12a-d of the respectively adjoining bipolar plates 2 and/or in each case at least between the perimeter beads 12d of the adjoining bipolar plates 2, in order in this way to fix the membrane 14 of the MEA 10 between the adjoining bipolar plates 2.

The edge portion 15 in each case covers the distribution or collection region 20 of the adjoining bipolar plates 2. Towards the outside, the edge portion 15 may also extend beyond the perimeter bead 12d and may at that point adjoin the outer edge region 22 of the individual plates 2a, 2b (cf. FIG. 2).

Furthermore, gas diffusion layers 16 may additionally be arranged in the active region 18. The gas diffusion layers 16 enable a flow across the membrane over the largest possible area of the surface of the membrane and can thus improve the proton transfer via the membrane. The gas diffusion layers 16 may for example be arranged on both sides of the membrane in the active region 18 between the adjoining bipolar plates 2. The gas diffusion layers 16 may for example be formed from a fibre fleece or may comprise a fibre fleece.

FIGS. 3A, 3B and 3C in principle show sections through the same portion of the plate stack. The differences between FIGS. 3A, 3B and 3C are that the arrangement of FIG. 3A shows an offset between adjacent stacked bipolar plates 2, while the arrangement of FIG. 3B has an offset between adjacent individual plates 2a, 2b. The arrangements of FIGS. 3A and 3B are the result of a lack of positioning accuracy when stacking the bipolar plates (FIG. 3A) or when positioning the anode plate relative to the cathode plate (FIG. 3B), as can often be observed in the prior art. The inaccurate positioning of the plates 2, 2a, 2b relative to each other may have various causes. Two different tools are generally used when machining each of the individual plates 2a, 2b, namely an embossing tool for embossing the flow field 17 and a punching tool for creating the through-openings 11a-c. If the individual plate is incorrectly positioned in one of the two tools, this can negatively affect the accuracy in subsequent machining steps. Even if the individual plates 2a, 2b have been produced with sufficient accuracy, it may happen that the individual plates 2a, 2b are offset relative to each other in a joining tool, which adversely affects the relative alignment between the individual plates 2a, 2b.

In FIG. 3A, the individual plates 2a, 2b of each bipolar plate are correctly positioned relative to each other. However, adjacent bipolar plates 2 are arranged with a lateral offset relative to each other, thereby creating an offset between the channel structures 29. Possible consequences of this lateral offset are performance losses or damage to the components. Furthermore, it can be seen in FIG. 3B that the individual plates 2a, 2b are incorrectly positioned relative to each other. For example, it is clear in FIG. 3B that the front faces 27a, 27b of the individual plates 2a, 2b are shifted relative to each other. This makes it difficult to weld the individual plates 2a, 2b in the joining step. In addition, the coolant no longer flows through defined channels 19, so that only insufficient cooling would take place with this arrangement.

To reduce the offset between the individual plates 2a, 2b of a bipolar plate 2, the prior art has suggested for example round positioning holes of equal hole diameter, which are provided in both individual plates 2a, 2b. A positioning pin is then inserted through the positioning holes in order to align or centre the individual plates 2a, 2b relative to each other. The individual plates 2a, 2b are then welded to form the bipolar plate. Since a slight offset of the plates 2a, 2b relative to each other is possible in the finished, welded individual plates 2a, 2b, these positioning holes cannot be used for stacking the bipolar plates 2. The bipolar plates 2 are therefore received at different points, at which one of the individual plates 2a, 2b is then cut free. This results in an additional space requirement, and the position of the bipolar plate 2 is then defined using a different reference system.

If two individual plates 2a, 2b are centred relative to each other at the same contours, these contours can no longer be used with the same accuracy to centre the bipolar plates 2 since the finished, joined individual plates 2a, 2b may have an offset relative to each other. If different contours are used for this, this leads to an additional space requirement and additional tolerances, since then the individual plates and the joined plates no longer have the identical reference system.

The present disclosure has been designed to enable a much more precise alignment and positioning of the individual plates 2a, 2b relative to each other or in a tool. The intention is also to enable accurate alignment of the bipolar plates 2 in a stack, while taking up a small amount of space.

FIG. 3C shows an arrangement of bipolar plates 2 or individual plates 2a, 2b according to one embodiment of the present disclosure, which is characterized by a very small offset between the bipolar plates 2 or individual plates 2a, 2b. In the portion shown in FIG. 3C, the two metal sheets 2a, 2b are optimally positioned one on top of the other. On the one hand, this results in the best possible bearing of the front faces 27a, 27b thereof, which may enable easy and sturdy welding. On the other hand, this results in the ideal shape of the cooling channels 19 and thus in an optimal cooling. The precise alignment and positioning of the bipolar plates or individual plates of FIG. 3C takes place by means of positioning openings 40, 30, 32, 34, 50, which will be explained in greater detail below.

FIG. 4 shows, in each of the two sub-FIGS. 4A and 4B, a plan view of a bipolar plate 2, the viewing direction being oriented along the negative z-direction 7. The bipolar plate 2 shown in FIG. 4A or 4B may have at least some features or all features of the individual plates 2a, 2b shown in FIGS. 1 and 2. Recurring features are denoted by the same reference signs as before. Like the individual plates 2a, 2b shown in FIGS. 1 and 2, the bipolar plate 2 according to both variants of FIG. 4 thus comprises two individual plates or metal sheets 2a, 2b. The individual plates or metal sheets 2a, 2b touch each other along their mutually facing flat sides and are joined to each other along their mutually facing flat sides. For instance, the metal sheets 2a, 2b of the bipolar plate 2 are joined to each other in a materially bonded manner, such as by one or more welded joints, for example by one or more laser-welded joints. Soldered joints or adhesive bonds are also possible as an alternative. In a manner corresponding to the bipolar plates 2 shown in FIGS. 1 and 2, the bipolar plate 2 shown in FIG. 4 may have through-openings 11a-c, bead arrangements 12a-d, an electrochemically active region 18, at least one distribution or collection region 20, and an outer edge region 22.

It should be noted here that intrinsically closed depressions and elastomeric sealing lips arranged therein may also be provided instead of the bead arrangements 12a-d. The course of these depressions and sealing lips may be the same as the course of the bead arrangements 12a-d shown in the figures. Hereinbelow, the bead arrangements 12a-12d and the depressions/sealing lips will be referred to in general as intrinsically closed sealing elements.

The bipolar plates 2 shown in FIGS. 4A and 4B differ from the bipolar plates 2 shown in FIGS. 1 and 2 in that the bipolar plate 2 shown in FIG. 4A has two positioning openings 30 and 32 and the bipolar plate 2 shown in FIG. 4B has three positioning openings 34, 34' and 34".

In the embodiment of the bipolar plate 2 shown in FIG. 4A, the two positioning openings 30, 32 are arranged in two diagonally opposed corner regions of the substantially rectangular bipolar plate 2.

In the embodiment of the bipolar plate 2 shown in FIG. 4B, the two positioning openings 34, 34' are arranged in two opposite outer edges 23 of the substantially rectangular bipolar plate 2. The third positioning opening 34" is arranged at a right angle to the two positioning openings 34, 34' on one of the two longitudinal edges. For reasons of space, the positioning openings 34, 34', 34" are not arranged symmetrically. Of course, in alternative embodiments, the positioning openings may also be arranged in other areas of the outer edge region 22 of the bipolar plate 2 or of the individual plates 2a, 2b.

Of course, in alternative embodiments, the bipolar plate 2 may also have more than two or three positioning openings, for example four or more than four. In FIGS. 4A and 4B, it can also be seen that the positioning openings 30, 32, 34, 34', 34" are arranged outside of the regions 17, 18, 20 and outside of the closed bead arrangements 12a-12d and are spaced apart therefrom. While the positioning opening 30 has rotational symmetry of at least order 3, but is not of circular shape, the positioning opening 32 is slot-shaped. The positioning openings 34, 34', 34" each correspond to segments of a slot; they are mirror-symmetrical or at least substantially mirror-symmetrical. The positioning openings 30, 32, 34, 34', 34" have a maximum diameter or a maximum extension $d_{max}$ that is smaller than the maximum diameter d of the media-guiding through-openings 11a-c.

The positioning openings 30 and 32 of the bipolar plate 2 of FIG. 4A on the one hand and the positioning openings 34, 34', 34" of FIG. 4B on the other hand are each formed by overlapping or aligned positioning openings 40, 50 of the individual plates 2b, 2a. The positioning openings 30, 32, 34, 34', 34", 40, 50 have the function of positioning the respective individual plate 2a, 2b relative to a tool or relative to a further, directly adjacent, individual plate or relative to a further, indirectly adjacent, bipolar plate. In addition, the edge reinforcements of the MEA (not shown here) may have passages in the relevant areas so that, with the aid of positioning pins, MEAs (such as together with GDLs) can be built up in a manner alternating with bipolar plates to form a stack. The positioning openings 30, 32, 40, 50 of FIG. 4A are each designed as a through-opening, the positioning openings 40, 50 being completely surrounded by material of the respective individual plate 2a, 2b. Usually, however, no media-guiding function is associated with this type of through-opening. For instance, the positioning openings 30, 32, 40, 50 differ functionally and structurally from the fluid-conducting through-openings 11a, 11b, 11c. Alternatively, the positioning openings 40, 50 may also be provided as a notch in an outer edge of the respective individual plate 2a, 2b, cf. the positioning openings 34, 34', 34". The positioning openings 34, 34', 34" are not designed as openings that are surrounded by material of the individual layers 2a, 2b in a completely closed manner, but rather are in each case open at one side.

FIGS. 5A-5D, 6A-6F and 7A-7C show positioning openings 30 and 32 of the bipolar plate 2 and positioning openings 40, 50 of the individual plates 2a, 2b according to different embodiments of the present disclosure.

The elements 40, 42, 43, 44, 45, 48, 49 mentioned below belong to the first individual plate 2a and will be qualified below by the adjective "first", while the elements 50, 52, 53, 54, 55, 58 belong to the second individual plate 2b and will be referred to by the adjective "second".

FIGS. 5A-5D show a slot-shaped positioning opening 32 similar to the one at the top right in FIG. 4.

FIGS. 6A-6F and FIGS. 7A-7C show a positioning opening 30 that has rotational symmetry of at least order 3, but is not of circular shape.

The bipolar plate 2 shown in FIGS. 6A-6F will be discussed first. The bipolar plate 2 comprises a first individual plate 2a and a second individual plate 2b, which are joined to each other.

The first individual plate 2a has at least one first positioning opening 40 with a first rim 42. The first positioning opening 40 comprises a first crimping 44, which completely surrounds the positioning opening 40. In the exemplary embodiment shown, the first rim 42 of the first positioning opening 40 is part of the first crimping 44. In the exemplary embodiment shown, a rim of the first crimping 44 that points towards the first positioning opening 40, and the first rim 42 of the first positioning opening 40 are identical. The second individual plate 2b comprises at least one second positioning opening 50 with a second rim 52. The second positioning opening 50 has at least one second crimping 54, which completely surrounds the positioning opening 50. In the exemplary embodiment shown, the second rim 52 of the second positioning opening 50 is part of the second crimping 54. In the exemplary embodiment shown, a rim of the second crimping 54 that points towards the second positioning opening 50 and the second rim 52 of the second positioning opening 40 are identical. The first crimping 44 and the second crimping 54 are optionally arranged on opposite flat sides of the bipolar plate 2 and point away from each other.

Furthermore, the two positioning openings 40, 50 are arranged in alignment with each other and form a positioning opening 30 of the bipolar plate 2.

The first positioning opening 40 and the second positioning opening 50 are of equal size and have the same contour. However, the second positioning opening 50 is rotated through an angle of 60° relative to the first positioning opening 40.

The first crimping 44 or the first rim 42 forms at least one first contact area 45 for a first positioning pin 102 and a second positioning pin 103. In the example shown, three first contact areas 45 are provided. However, the first crimping 44 may also have fewer than or more than three first contact areas 45.

The second crimping 54 or the second rim 52 forms at least one second contact area 55 for the first positioning pin 102. In the example shown, three second contact areas 55 are provided. However, the second crimping 54 may also have fewer than or more than three first contact areas 55.

The first contact area 45 and the second contact area 55 are located at different positions in the circumferential direction of the positioning opening 30 of the bipolar plate 2. An orthogonal projection of the second positioning opening 50 onto the first individual plate 2a perpendicular to the plate plane of the bipolar plate 2 defines a first projection area, the first individual plate 2a having at least part of the first crimping in the region of the first projection area. This part of the first crimping 44 forms the first contact area 45. Furthermore, an orthogonal projection of the first positioning opening 40 onto the second individual plate 2b perpendicular to the plate plane of the bipolar plate 2 defines a second projection area, the second individual plate 2b having at least part of the second crimping 54 in the region of the second projection area. This part of the second crimping 44 forms the second contact area 45.

While the first contact area 45 of the first individual plate 2a is thus designed to come into engagement both with the first positioning pin 102 and with the second positioning pin 103, the second contact area 55 of the second individual plate 2b only comes into engagement with the first positioning pin 102.

The first positioning opening 40 may have a rotational symmetry in relation to a first axis of symmetry 61. Here, the axis of symmetry 61 is oriented perpendicular to a first plate plane defined by the first individual plate 2a. The rotational symmetry of the first positioning opening 40 is of order 3, for example.

Similarly, the second positioning opening 50 may have a symmetry in relation to a second axis of symmetry 62, wherein the second axis of symmetry 62 is oriented perpendicular to a second plate plane defined by the second individual plate 2b. The rotational symmetry of the second positioning opening 50 is of order 3, for example.

The positioning opening 30 likewise may have a rotational symmetry in relation to an axis of symmetry 60. Here, the axis of symmetry 60 is oriented perpendicular to a plate plane defined by the bipolar plate 2. The rotational symmetry of the positioning opening 30, i.e. of the actual opening area, is of order 6, for example.

In the example shown, the aforementioned axes of symmetry 60, 61, 62 are congruent.

Figure 7C:
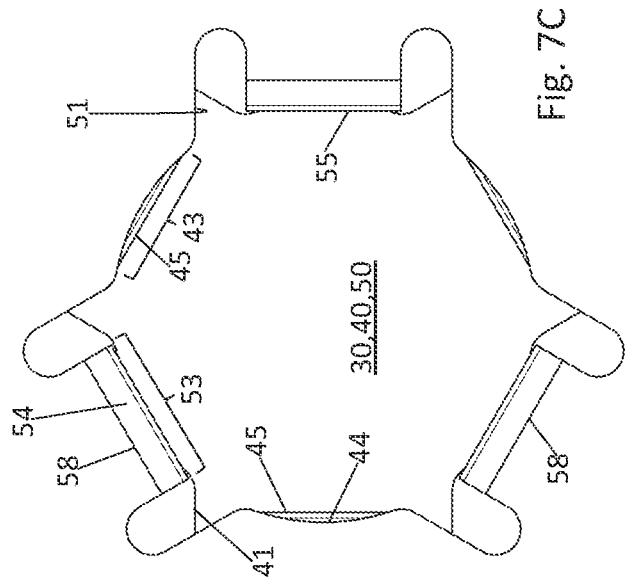
FIG. 7C schematically shows a section through the positioning opening of the bipolar plate of FIG. 7B.
Figure 7A:
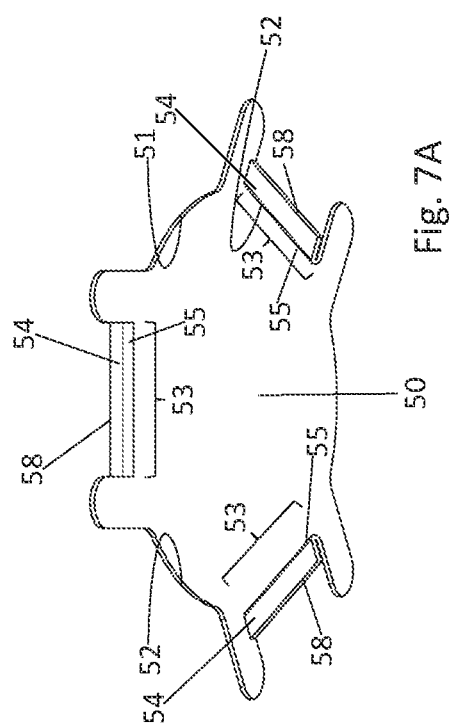
FIG. 7A schematically shows, in a perspective view, a positioning opening of an individual plate.
Figure 7B:
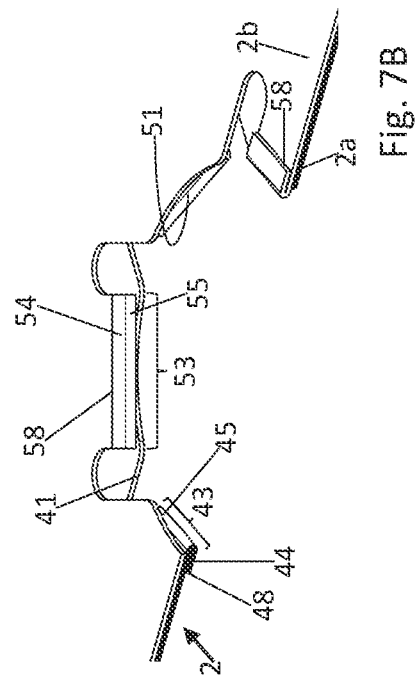
FIG. 7B schematically shows, in a plan view, a positioning opening of a further bipolar plate, which comprises the individual plate of FIG. 7A.

The modification shown in FIGS. 7A-7C differs from that shown in FIGS. 6A-6F in that the first crimping 44 and the second crimping 54 do not extend all the way around the respective positioning openings 40, 50. Instead, the first crimping 44 and the second crimping 54 are provided only in rim segments 43, 53 of the rims 42, 52.

The first rim 42 and the second rim 52 thus each have for example a plurality of rim segments 43, 53, which are spaced apart from each other in the circumferential direction of the respective positioning opening 40, 50. Rim segments 41, 51 without crimpings extend between the rim segments 43, 53 with the crimpings 44, 54.

Optionally, the rim segments 43, 53 extend in a radial direction of the respective positioning opening 40, 50. The rim segments 43, 53 of the two individual plates 2a, 2b are usually of identical shape, for example tab-shaped, but may also have different shapes.

As in FIGS. 6A-6F, the positioning openings 40, 50 of the individual plates 2a, 2b shown in FIGS. 7A-7C are also identical to each other in terms of size and contour, but have a different orientation in each case. The first rim segments 43 of the first individual plate 2a and the second rim segments 53 of the second individual plate 2b are arranged at different positions in relation to a circumferential direction of the positioning opening 30 of the bipolar plate 2. For instance, the second rim segments 53 are rotated through an angle of 60° about a central axis of the positioning opening 30 in relation to the first rim segments 43.

The first rim segments 43 form the first contact area 45 for the first positioning pin 102 and the second positioning pin 103, while the second rim segments 53 form the second contact area 55 for only the first positioning pin 102.

As in FIGS. 6A-6F, the positioning openings 40, 50 each have a rotational symmetry of order 3, while the positioning opening 30 has a rotational symmetry of order 6.

A further modification of the bipolar plate 2 is shown in FIGS. 5A-5D. As in FIGS. 6A-6F, each positioning opening 40, 50 in the modification of FIGS. 5A-5D has a single crimping 44, 54, which completely surrounds the positioning opening 40, 50. In a manner differing from the embodiments of FIGS. 6A-6F and 7A-7C, the positioning openings 40, 50 are each of different size and shape. For instance, an area of the positioning opening 40 is smaller than that of the positioning opening 50. Furthermore, the positioning openings 32, 40, 50 are designed for example as slots, wherein longitudinal axes of the positioning openings 32, 40, 50 designed as slots may have an identical orientation.

The elongated positioning openings 32, 40, 50 of FIGS. 5A-5D generally do not have an axis of rotational symmetry. Instead, the positioning opening 32, the first positioning opening 40 and the second positioning opening 50 may have a symmetry in relation to a plane of symmetry, the respective plane of symmetry being oriented perpendicular to the plate plane defined by the respective plate 2, 2a, 2b. In the exemplary embodiment shown, the planes of symmetry of the positioning openings 32, 40, 50 are congruent.

For example, the first crimping 44 forms a first contact area 45 for a first positioning pin 100, which has an elongated cross-sectional shape. The second crimping 54 forms a second contact area 54 for the same positioning pin 100. The first contact area 45 and the second contact area 55 are located at identical positions in the circumferential direction of the positioning opening 32 of the bipolar plate 2. In addition, the first crimping 44 may have a third contact area 46 for a second positioning pin 101. The contact areas 45, 46, 55 may be arranged on the longer side of the positioning openings 40, 50.

An orthogonal projection of the second positioning opening 50 onto the first individual plate 2a perpendicular to the plate plane of the bipolar plate 2 may define a first projection area, the first individual plate 2a having at least part of the first crimping 44 in the region of the first projection area. The first crimping 44 forms in the region of the first projection area the third contact area 46 for the second positioning pin 101.

The area of the positioning opening 32 bounded by the dashed square in FIGS. 5A to 5D represents an embodiment as already shown in FIG. 4B; in this variant, the dash-dotted line 23 bounds both the metal plates 2a, 2b and—as a virtual edge—the positioning opening 34.

The function of the contact areas 45, 46, 55 and the function of the positioning pins 100, 101, 102, 103 will be described below in connection with the production method.

Common features of the embodiments of FIGS. 5A-5D, 6A-6F and 7A-7C will be further discussed below.

The respective crimping 44, 54 typically extends in a radial direction away from the respective positioning opening 40, 50. A free end 48, 58 of the material surrounding the respective positioning opening 40, 50 may be crimped through at least 160° in relation to a plate plane defined by the respective individual plate 2a, 2b. In the exemplary embodiments shown, the free end is crimped through approximately 180° and makes contact with non-formed portions of the respective individual plate 2a, 2b. Furthermore, the free end 48, 58 may be oriented substantially parallel to the plate plane of the respective individual plate 2a, 2b.

In the region of the crimping 44, 54, a height of the respective individual plate 2a, 2b, measured perpendicular to the respective plate plane, may be smaller than a maximum height of the individual plate 2a, 2b, for instance smaller than a height of the media-conducting embossed structures 17, 18, 20 or a height of the sealing elements 12a-d. The height in the region of the crimping may be substantially at most four times, such as at most three times a thickness of the stainless steel sheet of the individual plates 2a, 2b.

FIG. 8 shows, in five sub-FIGS. 8A to 8E, possible orientations of the crimpings 44, 54 of a bipolar plate 2. The orientation in FIG. 8A corresponds to that shown in FIG. 6C; the first crimping 44 and the second crimping 54 point in different axial directions of the first positioning opening 40. They are arranged on opposite flat sides of the bipolar plate 2 and point away from each other. Also in FIG. 8B, the first crimping 44 and the second crimping 54 point in different axial directions in relation to the positioning openings 40 and 50, but in this case face towards each other. FIGS. 8C, 8D and 8E show details of bipolar plate 2, in which the crimpings 44 and 54 each in the same axial direction in relation to the positioning openings 40 and 50. FIGS. 8C and 8D differ in that, in FIG. 8D, a cranked region 47 is provided in the portion of the individual plate 2a arranged at a distance from the positioning opening 40. The cranked region 57 in the individual plate 2b is likewise provided in the portion of the individual plate arranged at a distance from the positioning opening 50, but compared to the cranked region 47 in FIG. 8D is arranged at a smaller distance from the positioning opening 50. Similar cranked regions 47, 57 are also shown in FIG. 8B; they serve in each case to adapt the height in different areas of a separator plate 2a, 2b, for example to adjust the height relative to a sealing element.

Figure 10:
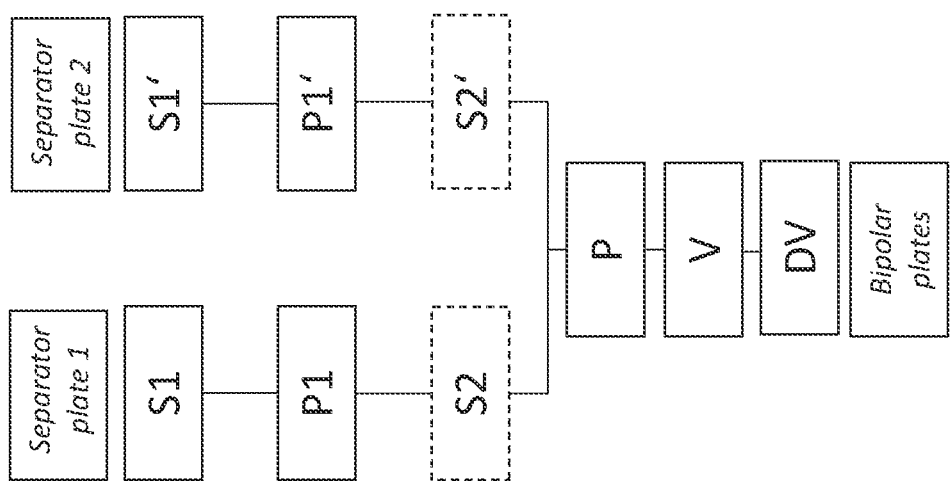
FIG. 10 shows a flowchart of a method for producing a bipolar plate.

One embodiment of a method for producing the individual plates 2a, 2b and for producing the bipolar plate 2 will be described below with reference to FIG. 10.

In a preparatory step, two plates in the form of metal sheets are provided, namely a first plate and a second plate.

In step S1, at least one positioning hole is formed in the first plate, the positioning hole may be created by punching the plate by means of a punching tool. In step P1, the first plate is formed in such a way that material of a hole rim of the positioning hole is crimped. This creates the aforementioned first positioning opening 40 and the associated crimping 44. At the same time, the flow field 17 of the above-described type for guiding a medium along a flat side of the individual plate 2a is created.

The forming may take place by deep drawing, hydroforming or embossing the plate in a suitable deep-drawing, hydroforming or embossing tool. As a result, the resulting positioning opening 40 has a larger diameter and a larger area than the original positioning hole. Due to manufacturing tolerances, it may happen that an arrangement of a centre point of the positioning opening 40 differs from an initial arrangement of a centre point of the positioning hole, since any manufacturing tolerance initially present will be compensated when forming the positioning opening 40 at the same time as forming the flow field 17. In an optional subsequent step S2, an outer contour of the individual plate 2b is formed by cutting the metal sheet. Step S2 is carried out for example by means of a cutting device, such as a punching device or a laser cutting device. Alternatively, the outer contour may already be cut at the same time as the positioning holes. The first individual plate 2a is now ready.

The second individual plate 2b is produced simultaneously with, before or after the formation of the first individual plate 2a.

In step S1', at least one positioning hole is created in the second plate, the positioning hole may be created by punching the second plate. In step P1', the second plate is formed in such a way that simultaneously, for each positioning hole, a positioning opening 50 of the above-described type is created with a second crimping 54, as well as a flow field 17 for guiding a medium along a flat side of the individual plate 2b.

The forming may take place by deep drawing, hydroforming or embossing the second plate in a suitable deep-drawing, hydroforming or embossing tool. The second crimping 54 may be formed by folding over an edge of the positioning hole. The resulting positioning opening 50 thus has a larger diameter and a larger area than the original positioning hole. Due to manufacturing tolerances, it may happen that an arrangement of a centre point of the positioning opening 50 differs from an initial arrangement of a centre point of the positioning hole, since any manufacturing tolerance initially present will be compensated when forming the positioning opening 50 at the same time as forming the flow field 17. In an optional subsequent step S2', an outer contour of the second individual plate 2b is formed by cutting the metal sheet. Step S2' is carried out for example in a cutting device, such as a punching device or a laser cutting device. Alternatively, the outer contour may already be cut at the same time as the positioning holes. The second individual plate 2a is now ready.

The respective forming step P1, P1' may comprise a single step or alternatively may include a pre-forming step in a pre-embossing tool and a finish-forming step in a finish-embossing tool 110. One example of a finish-embossing tool 110 is shown in FIGS. 9A, 9B. The component pre-embossed in the pre-embossing tool, namely individual plate 2a in the example shown, has a collar 49 created by the pre-embossing, which collar extends around the first positioning hole. The collar 49 is oriented at an angle, for instance perpendicular to the plate plane of the individual plate 2a. In the finish-embossing tool 110, the collar 49 is folded over in a radially outward direction, so that the crimping 44 of the type described above and the first positioning opening 40 are created. The individual plate 2b can be produced in a corresponding manner.

It should be mentioned at this point that the flow field 17 are formed in a single forming step, namely in the aforementioned finish-forming step. Alternatively, the flow field may also be created in both of the aforementioned steps, i.e. the pre-forming step and the finish-forming step.

Due to the fact that the positioning opening 40, 50, the crimping 44, 54 and the media-guiding embossed structures 17, 18, 20 are formed simultaneously in the same tool, manufacturing tolerances firstly can remain constant and secondly can be better observed. Since the positioning openings 40, 50 and the respective flow field 17 are simultaneously formed in the plate, the positioning opening 40, 50 and the flow field 17 of the respective individual plate 2a, 2b can be very precisely arranged relative to each other. For example, the positioning opening 40, 50 and the flow field 17 may have a predetermined position and/or orientation relative to each other, with a deviation from the predetermined position being less than 200 μm, less than 100 μm, or less than 50 μm. In addition, the accuracy with which the positioning opening is produced largely depends on just one tool, namely the embossing, hydroforming or deep-drawing tool. The arrangement of the positioning hole previously formed by the punching tool may have a larger, for example unacceptably large, manufacturing tolerance relative to the flow field 17. The final arrangement of the centre point of the positioning opening 40, 50 may thus differ from the initial arrangement of the centre point of the positioning hole.

Once the two individual plates 2a, 2b have been completed, the individual plates 2a, 2b are placed one on top of the other in such a way that the positioning openings 40, 50 are in alignment with each other.

The individual plates 2a, 2b may for example be placed one on top of the other by means of a first positioning pin 100 (see FIG. 5A), 102 (cf. FIG. 6A) of a fixing device, with the first positioning pin 100 or 102 engaging in both positioning openings 40, 50. In positioning step P, the individual plates 2a, 2b are positioned one on top of the other. The crimpings 44, 54 of the individual plates 2a, 2b, such as only the contact areas 45, 55, come into contact with the first positioning pin 100 or 102. Consequently, the individual plates 2a, 2b are fixed with a form fit in some portions. As a result, there is no need for any further measures for fixing the two individual plates 2a, 2b relative to each other.

Following the positioning, the individual plates 2a, 2b can be joined to each other in a materially bonded manner in the joining step V, for instance by welding, such as laser welding, soldering or adhesive bonding.

Figure 5B:
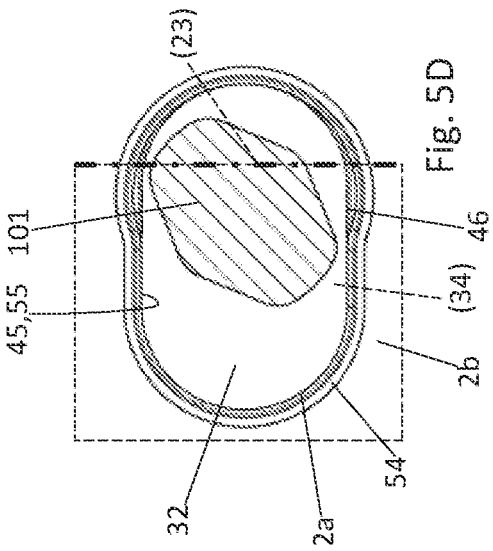
FIG. 5B schematically shows a plan view of a positioning opening of a bipolar plate comprising the individual plates of FIG. 5A.
Figure 5C:
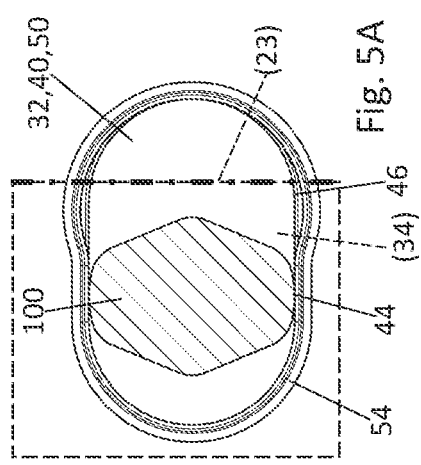
FIG. 5C schematically shows a plan view of the positioning opening of the bipolar plate of FIG. 5B, which is aligned relative to further bipolar plates by means of a second positioning pin.
Figure 5D:
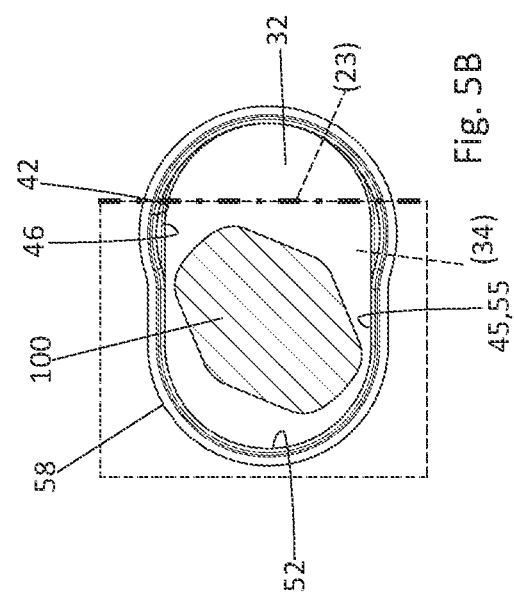
FIG. 5D schematically shows a plan view of the positioning opening of the bipolar plate of FIG. 5C, which is pressed together with further bipolar plates.

Following the welding, the bipolar plate 2 can be detached from the respective positioning pin 102, 100 in step DV by rotating the positioning pin 102 (cf. FIG. 6B) or the positioning pin 100 (cf. FIG. 5B). In doing so, the contact areas 45, 55 and the positioning pin 100, 102 are brought out of engagement. As an alternative or in addition, the first positioning pin may also be detached from the bipolar plate 2 by lateral displacement parallel to the plate plane of the bipolar plate 2.

The angle of rotation necessary for the detachment may depend on a rotational symmetry of the positioning pin 102 in relation to the longitudinal axis thereof. The positioning pin 102 has for example a rotational symmetry of order 6. For detachment, therefore, the positioning pin 102 may be rotated through an angle of approximately $\phi/2$, where $\phi=360°/6=60°$. The angle of rotation is therefore 30° in this case, with a deviation of 20% from this angle usually being permissible.

Figure 11:
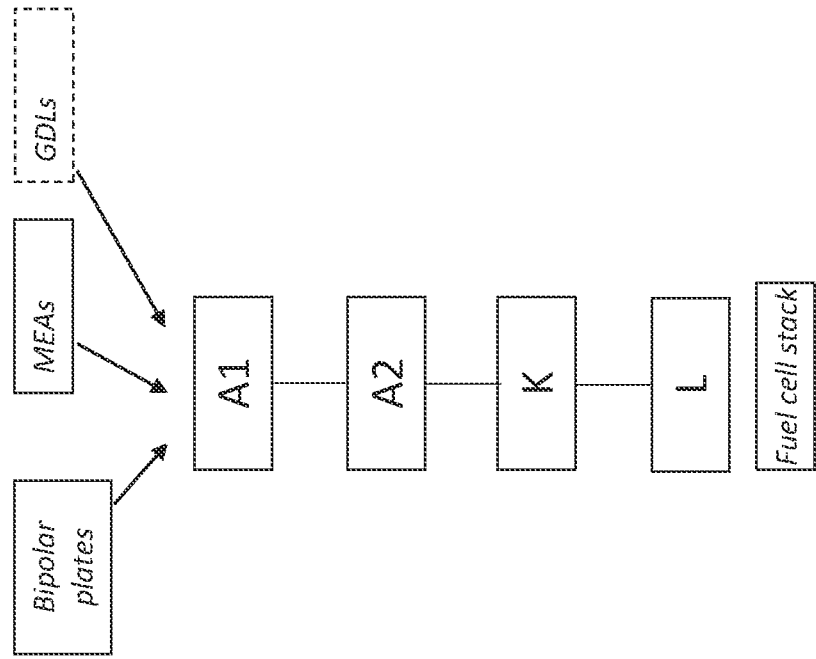
FIG. 11 shows a flowchart of a method for producing a bipolar plate stack or an electrochemical system.

The electrochemical system 1 can then be created by stacking and subsequently compressing the bipolar plates 2, the MEAs 10 and, if present, the gas diffusion layers 16, cf. FIG. 11.

First, in step A1, the bipolar plates 2 and the MEAs 10 are stacked in an alternating manner, for instance using at least one second positioning pin. Here, the second positioning pin 101, 103 (cf. FIG. 5C, FIG. 6D) is inserted into the positioning openings 30 of the bipolar plates 2, or the bipolar plates 2 are placed onto the second positioning pin 101, 103 (cf. FIG. 5C, FIG. 6D). Two or three second positioning pins 101, 103 may be used. Here, only the first contact area 45 of the first individual plate 2a comes into contact with the second positioning pin 103 (cf. FIG. 6D). Alternatively, only the third contact area 46 of the first individual plate 2a comes into contact with the third positioning pin 101 (cf. FIG. 5C). In other words, the second individual plate 2b of the bipolar plate 2 is spaced apart from the second positioning pin 101, 103 in a radial direction.

The bipolar plates of the embodiment of FIGS. 7A-7C can be stacked and positioned in a similar way to those of FIGS. 6A-6F.

Thereafter, in step A2, two end plates 3, 4 and optionally different terminating bipolar plates are provided for terminating the stack 6 at both ends of the stack 6.

In the subsequent step K, the stack 6 including the end plates 3, 4 is compressed. As the bipolar plates 2 are compressed, the shape of the crimpings 44, 54 and of the position openings 40, 50 is retained since these are not compressed.

In step L, the positioning pin 101, 103 is detached from the compressed stack 6. This can be done by rotating (FIG. 5D, 6E) or displacing the respective positioning pin 101, 103.

The angle of rotation necessary for the detachment may depend on a rotational symmetry of the positioning pin 103 in relation to the longitudinal axis thereof. The positioning pin 103 has for example a rotational symmetry of order 3. For detachment, therefore, the positioning pin 103 may be rotated through an angle $\phi/2$, where $\phi=360°/3=120°$. The desired angle of rotation is therefore approximately 60°, with a deviation of 20% from this angle usually being permissible.

It will be understood that features of the embodiments described above can be combined with each other or claimed individually, provided that they do not contradict each other.

FIGS. 1-9D are shown approximately to scale. FIGS. 1-9D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A bipolar plate for an electrochemical system, comprising:
   a first individual plate and a second individual plate connected to each other, the first individual plate has at least one first positioning opening with a first crimping, the first positioning opening being at least partially surrounded by the first crimping, the second individual plate has at least one second positioning opening with a second crimping, wherein the second positioning opening is at least partially surrounded by the second crimping, the first positioning opening and the second positioning opening of the individual plates are arranged in alignment with each other and form a positioning opening of the bipolar plate, the first crimping forms at least one first contact area for a first positioning pin and the second crimping forms at least one second contact area for the first positioning pin.

2. The bipolar plate according to claim 1, wherein a first rim of the first positioning opening and/or a second rim of the second positioning opening have a plurality of rim segments, which are spaced apart from each other in the circumferential direction of the respective positioning opening, wherein in at least one first rim segment of the first rim is part of the first crimping and/or in at least one second rim segment of the second rim is part of the second crimping.

3. The bipolar plate according to claim 2, wherein the first rim segments and the second rim segments are arranged at different positions in relation to a circumferential direction of the positioning opening of the bipolar plate.

4. The bipolar plate according to claim 1, wherein the first crimping and/or the second crimping completely surrounds the respective positioning opening.

5. The bipolar plate according to claim 1, wherein the first positioning opening and the second positioning opening are different from each other in terms of surface area and/or contour and/or orientation.

6. The bipolar plate according to claim 1, wherein the first crimping and the second crimping point in different axial directions of the first positioning opening and are arranged on opposite flat sides of the bipolar plate and point away from each other.

7. The bipolar plate according to claim 1, wherein the first crimping and the second crimping point in the same axial direction of the first positioning opening.

8. The bipolar plate according to claim 1, wherein the first crimping forms at least one third of a contact area for a second positioning pin.

9. The bipolar plate according to claim 1, wherein the first contact area, the second contact area and/or the third contact area are located at different positions in the circumferential direction of the positioning opening of the bipolar plate.

10. The bipolar plate according to claim 1, wherein an orthogonal projection of the second positioning opening onto the first individual plate perpendicular to the plate plane of the bipolar plate defines a first projection area, the first individual plate having at least part of the first crimping in the region of the first projection area, and/or an orthogonal projection of the first positioning opening onto the second individual plate perpendicular to the plate plane of the bipolar plate defines a second projection area, the second individual plate having at least part of the second crimping in the region of the second projection area.

11. The bipolar plate according to claim 10, wherein the first crimping comprises the first contact area and/or the third contact area in the region of the first projection area, and/or the second crimping comprises the second contact area in the region of the second projection area.

12. A method comprising:
stacking a plurality of the bipolar plates according to claim 1;
positioning the positioning openings of the bipolar plates on a second positioning pin; and
pressing the bipolar plates together to form a stack.

13. The method according to claim 12, wherein only the first crimpings of the first individual plates come into contact with the second positioning pin, while the second crimpings of the second individual plates are spaced apart from the second positioning pin in the radial direction.

14. The method according to claim 12, further comprising:
removing the stack by laterally displacing the second positioning pin perpendicular to an axial direction defined by the positioning pin in the state of contact and/or by rotating the second positioning pin.

15. A method for producing a bipolar plate, comprising:
providing a first individual plate and a second individual plate;
creating at least one first positioning hole in the first individual plate and at least one second positioning hole in the second individual plate;
forming the first individual plate in such a way that a first edge of the first positioning hole is at least partially crimped to form a first positioning opening, so that the first positioning opening has a first crimping;
forming the second individual plate in such a way that a second edge of the second positioning hole is at least partially crimped to form a second positioning opening, so that the second positioning opening has a second crimping;
positioning the positioning openings of the individual plates on a first positioning pin, wherein the two crimping s of the individual plates come into contact with the first positioning pin, and
joining the two individual plates.

16. The method according to claim 15, wherein, in the respective forming step, a flow field for guiding a medium along a flat side of the respective individual plate is simultaneously formed in the respective individual plate.

17. The method according to claim 15, wherein the respective forming step includes a pre-forming step and a finish-forming step.

* * * * *